(12) United States Patent
Takahashi et al.

(10) Patent No.: US 10,594,632 B2
(45) Date of Patent: Mar. 17, 2020

(54) INFORMATION PROCESSING APPARATUS AND DISTRIBUTED PROCESSING METHOD

(71) Applicant: FUJITSU LIMITED, Kawasaki-shi, Kanagawa (JP)

(72) Inventors: Eiichi Takahashi, Kawasaki (JP); Miwa Okabayashi, Sagamihara (JP); Akira Shiba, Kawasaki (JP); Hisatoshi Yamaoka, Kawasaki (JP); Shizuko Ichikawa, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/160,976

(22) Filed: Oct. 15, 2018

(65) Prior Publication Data

US 2019/0132263 A1 May 2, 2019

(30) Foreign Application Priority Data

Nov. 2, 2017 (JP) ................... 2017-213059

(51) Int. Cl.
*H04L 12/861* (2013.01)
*H04L 29/08* (2006.01)

(52) U.S. Cl.
CPC ......... *H04L 49/9089* (2013.01); *H04L 67/12* (2013.01)

(58) Field of Classification Search
CPC ............................ H04L 49/9089; H04L 67/12
See application file for complete search history.

(56) References Cited

U.S. PATENT DOCUMENTS

2013/0173764 A1  7/2013  Kami
2017/0006006 A1*  1/2017  Rawcliffe ............... H04L 67/10

FOREIGN PATENT DOCUMENTS

JP    2002-117042    4/2002
WO   2012/035947    3/2012

* cited by examiner

*Primary Examiner* — Duc C Ho
(74) *Attorney, Agent, or Firm* — Fujitsu Patent Center

(57) ABSTRACT

An information processing apparatus includes a memory and a processor coupled to the memory. The processor is configured to identify a reducible message string by using state transition information. The reducible message string is used to reduce a message string held in a message queue. The state transition information indicates a relationship between a message for executing a service and transition of a state of the service. The processor is configured to detect the reducible message string included in the message string. The processor is configured to reduce the message string held in the message queue by using the reducible message string.

9 Claims, 24 Drawing Sheets

$$A = \begin{bmatrix} d & a & o & n & o & o & o \\ d & o & n & o & o & o & o \\ d & n & o & o & o & o & o \\ d & o & o & n & o & o & o \\ d & o & o & o & o & b & o \\ d & o & o & o & o & o & n \\ d & o & o & o & o & o & n \end{bmatrix}$$

FIG. 4B $$A^2 = \begin{bmatrix} ad|bd & o & o & o & o & o \\ nd & da & an & o & db & bn & o \\ nd & da|nn & o & rn & db & o & o \\ nd & da & m & o & db & o & o \\ nd & da & o & o & db & o & o \\ nd & da & o & o & db|nn & o & nn \end{bmatrix}$$

FIG. 4C

| | 1 | 2 | 3 | 4 | 5 | 6 | 7 |
|---|---|---|---|---|---|---|---|
| 1 | | | | | | | |
| 2 | d | a | | | | | |
| 3 | d | | n | | | | |
| 4 | d | | | n | | | |
| 5 | d | | | | b | | |
| 6 | d | | | | | n | |
| 7 | d | | | | n | | n |

```
"state_transition_table": [
    { "from": STATE BEFORE TRANSITION, "to": STATE AFTER TRANSITION,
    "messages": TRANSITION MESSAGE STRING },
    ...
]}
```

FIG. 9B

```
{ "state_transition_table": [
    { "from": "1", "to": "2", "messages": ["a"] },
    { "from": "1", "to": "5", "messages": ["b"] },
    { "from": "2", "to": "1", "messages": ["d"] },
    { "from": "2", "to": "3", "messages": ["n"] },
    { "from": "3", "to": "1", "messages": ["d"] },
    { "from": "3", "to": "4", "messages": ["n"] },
    { "from": "4", "to": "1", "messages": ["d"] },
    { "from": "4", "to": "2", "messages": ["n"] },
    { "from": "5", "to": "1", "messages": ["d"] },
    { "from": "5", "to": "6", "messages": ["n"] },
    { "from": "6", "to": "1", "messages": ["d"] },
    { "from": "6", "to": "7", "messages": ["n"] },
    { "from": "7", "to": "1", "messages": ["d"] },
    { "from": "7", "to": "5", "messages": ["n"] }
]}
```
330

FIG. 14A
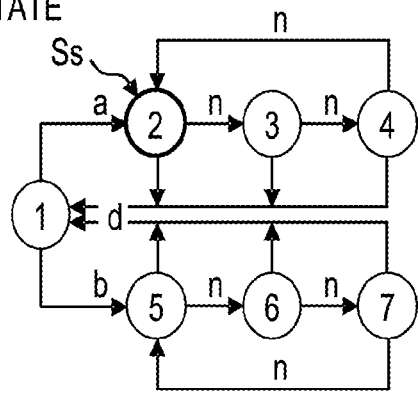
FIG. 14B
| STATE | DELETABLE MESSAGE STRING |
|---|---|
| 1 | ad |
| 2 | nnn |
| 2 | da |
| ... | ... |
| 5 | nnn |
| ... | ... |
FIG. 14C
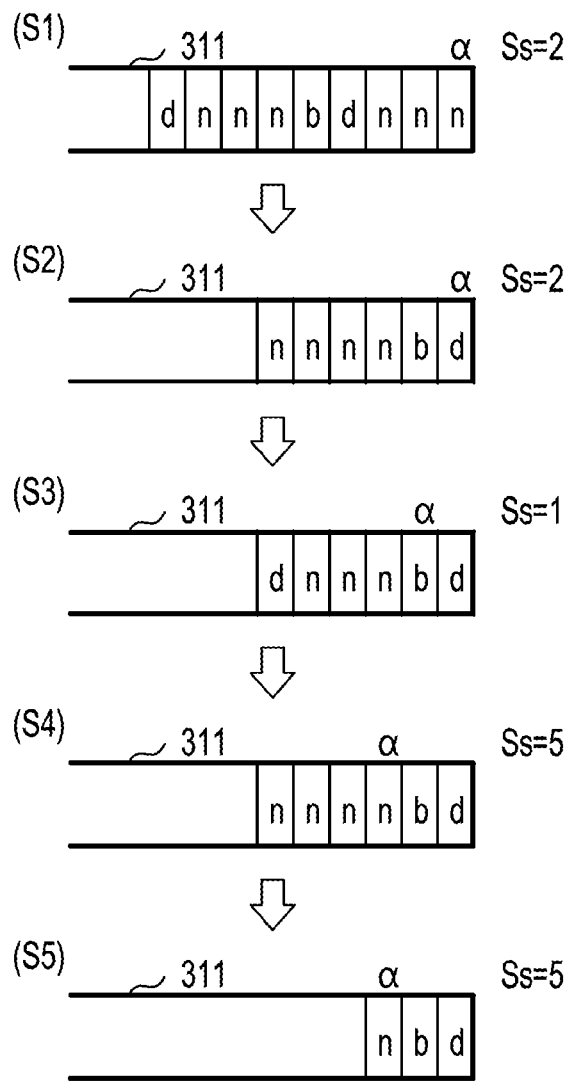

```
   a1      a2      a3      a4
(1)───▶(2)───▶(3)───▶(4)───▶(5)───▶( )
        │                      ▲
        └──────── b1 ──────────┘
```

FIG. 21B $$P = \begin{bmatrix} ad|bd & 0 & 0 & 0 & 0 & 0 \\ nd & da & an & 0 & 0 & 0 \\ nd & da|nn & 0 & nn & db & 0 \\ nd & da & nn & 0 & db & 0 \\ nd & da & 0 & 0 & db & nn \\ nd & da & 0 & 0 & db|nn & 0 \end{bmatrix}$$

```
{" state_transition_table": [
  { "from":"1", "to":"2", "messages": ["'a'"] },
  { "from":"1", "to":"5", "messages": ["'b'"] },
  { "from":"2", "to":"1", "messages": ["'d'"] },
  { "from":"2", "to":"3", "messages": ["'d'"] },
  { "from":"3", "to":"1", "messages": ["'d'"] },
  { "from":"3", "to":"4", "messages": ["'n'"] },
  { "from":"4", "to":"1", "messages": ["'d'"] },
  { "from":"5", "to":"1", "messages": ["'n'"] },
  { "from":"5", "to":"6", "messages": ["'d'"] },
  { "from":"6", "to":"7", "messages": ["'n'"] },
  { "from":"7", "to":"1", "messages": ["'d'"] },
  { "from":"7", "to":"5", "messages": ["'n'"] }
]}
```

INFORMATION PROCESSING APPARATUS AND DISTRIBUTED PROCESSING METHOD

CROSS-REFERENCE TO RELATED APPLICATION

This application is based upon and claims the benefit of priority of the prior Japanese Patent Application No. 2017-213059, filed on Nov. 2, 2017, the entire contents of which are incorporated herein by reference.

FIELD

The embodiments discussed herein are related to an information processing apparatus and a distributed processing method.

BACKGROUND

In recent years, many IoT (Internet of Things) devices such as sensors and home appliances that may be connected to a network have appeared. Furthermore, there is a recent tendency of increase in the number of services for controlling the IoT devices through a sensing by a sensor or an operation by a portable terminal.

Such services may be constructed as a distributed system called a micro service architecture. Most of micro services each provide a single function such as a search or an authentication. In the distributed system, plural micro services are combined and linked with each other by exchanging messages to construct a service.

Related techniques are disclosed in, for example, International Publication Pamphlet No. WO 2012/035947 and Japanese Laid-open Patent Publication No. 2002-117042.

SUMMARY

According to an aspect of the present invention, provided is an information processing apparatus including a memory and a processor coupled to the memory. The processor is configured to identify a reducible message string by using state transition information. The reducible message string is used to reduce a message string held in a message queue. The state transition information indicates a relationship between a message for executing a service and transition of a state of the service. The processor is configured to detect the reducible message string included in the message string. The processor is configured to reduce the message string held in the message queue by using the reducible message string.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 4A to 4C are views for explaining state transition information and a deletable message string;

FIGS. 9A and 9B are views illustrating an example of state transition information according to the first embodiment;

FIGS. 14A to 14C are views for specifically explaining a message deletion according to the first embodiment;

FIGS. 21A and 21B are views illustrating an example of state transition information and a state transition matrix according to the third embodiment;

DESCRIPTION OF EMBODIMENTS

In the above-described distributed system, there is a case where a micro service on a message transmitting side transmits a message at a rate exceeding the processing speed of a micro service on a message receiving side. In this case, there is a possibility that a message overflows from the queue of the micro service on the message receiving side and is missing, which may lead to an incorrect linkage between micro services.

First Embodiment

Figure 1:
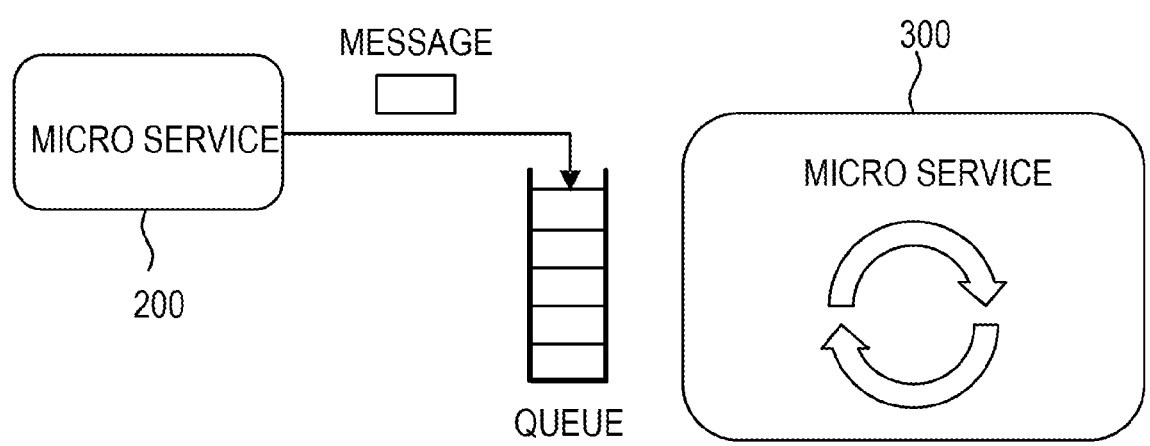
FIG. 1 is a view for explaining a structure of a micro service.

Hereinafter, a first embodiment will be described with reference to the accompanying drawings. FIG. 1 is a view for explaining the mechanism of a micro service.

In the present embodiment, a micro service refers to an application that implements a single function. In the present embodiment, one service is implemented by linking plural micro services by a message. In the following description, a system that combines plural micro services with each other to provide one service will be referred to as a distributed processing system.

In FIG. 1, in a distributed processing system constructed by a micro service 200 and a micro service 300, the micro service 200 and the micro service 300 are linked to each other by messages. In the example of FIG. 1, the micro service 200 is a transmitting side micro service that transmits messages, and the micro service 300 is a receiving side micro service that receives the messages.

In the example of FIG. 1, the micro service 200 continuously transmits messages. The transmitted messages are held in the FIFO (First In, First Out) format in the queue of the micro service 300. The micro service 300 repeats taking out and executing the messages from the queue. In this way, the micro services 200 and 300 are linked to each other by messages.

In the present embodiment, messages are prevented from overflowing and missing from the queue of the receiving side micro service. More specifically, in the present embodiment, a message string that may be deleted is detected from the messages held in the queue, and the detected message string is deleted, so as to suppress the overflow of the messages from the queue. In the following description, a message string that may be deleted will be referred to as a deletable message string.

Figure 2:
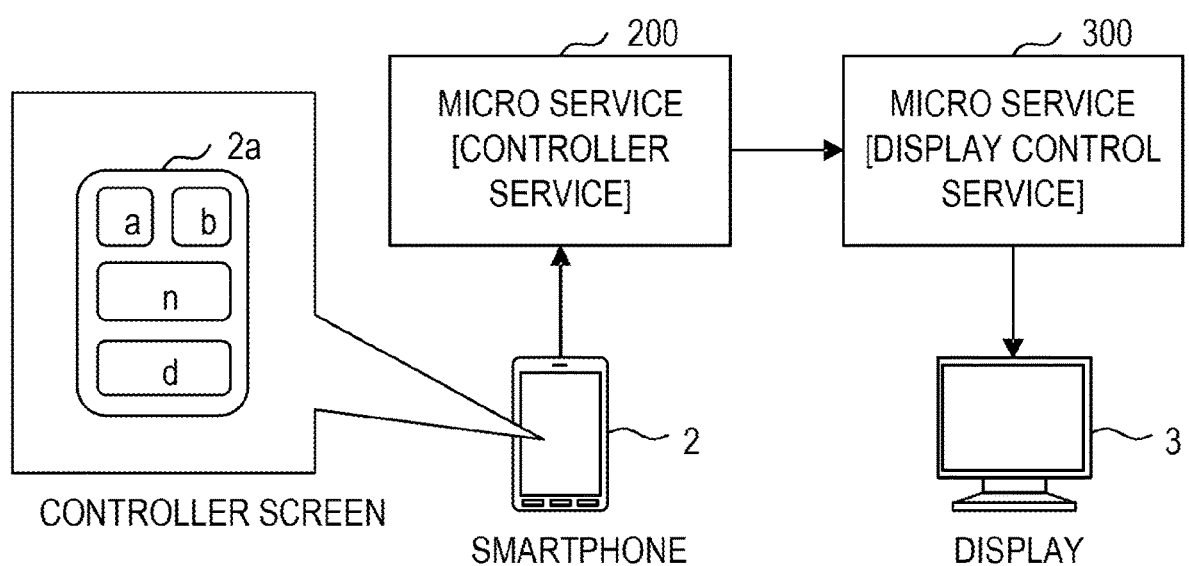
FIG. 2 is a view for explaining a deletable message string.

Hereinafter, the deletable message string of this embodiment will be described with reference to FIGS. 2 and 3. FIG. 2 is a view for explaining a deletable message string.

In FIG. 2, a transmitting side micro service 200 is, for example, a controller service that causes a terminal device 2 to function as a controller for controlling display of a display 3. The terminal device 2 is, for example, a smartphone or a tablet terminal.

A receiving side micro service 300 is, for example, a display control service for controlling display of the display 3. The display 3 may be, for example, a television.

The micro service 200 is built on a network. In this embodiment, for example, upon receiving an operation request of the display 3 from the terminal device 2, the micro service 200 causes the terminal device 2 to display a control screen 2a, so that the terminal device 2 functions as a controller of the display 3.

In the terminal device 2, when an operation instruction for the display 3 is input, the micro service 200 transmits a message corresponding to the operation instruction to the micro service 300. Upon receiving the message, the micro service 300 holds the received message in the queue. Then, the micro service 300 takes out the message held in the queue and causes the display 3 to transition to a state corresponding to the message. Further, when a predetermined number of messages are stored in the queue, the micro service 300 detects and deletes a deletable message string from the retained messages.

Figure 3:
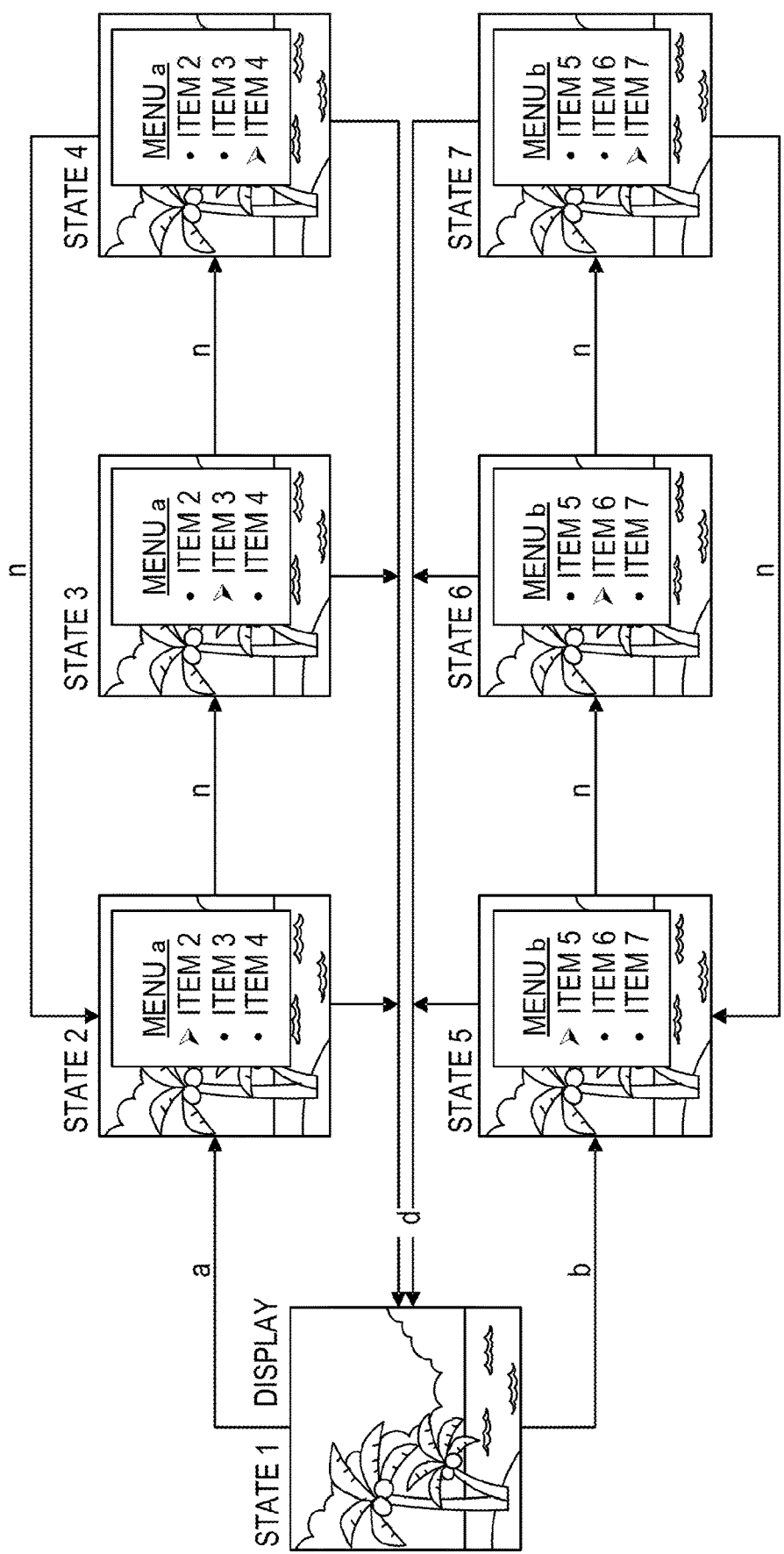
FIG. 3 is a view illustrating a relationship between a message and a display state.

FIG. 3 is a view illustrating a relationship between a message and a display state. FIG. 3 illustrates an example of a transition of the state of the display 3 when an input to the control screen 2a displayed on the terminal device 2 is used as a message.

State 1 indicates a state of the display 3 in which the display 3 is receiving no operation from the terminal device 2. In other words, the state 1 indicates the initial state of the display 3.

State 2 indicates a state of the display 3 when a button "a" is operated on the control screen 2a in the state 1, the micro service 200 transmits a message "a" to the micro service 300, and the micro service 300 takes out and executes the message "a". State 3 indicates a state of the display 3 when a button "n" is operated on the control screen 2a in the state 2, the micro service 200 transmits a message "n" to the micro service 300, and the micro service 300 takes out and executes the message "n". State 4 indicates a state of the display 3 when a button "n" is operated on the control screen 2a in the state 3, the micro service 200 transmits a message "n" to the micro service 300, and the micro service 300 takes out and executes the message "n".

State 5 indicates a state of the display 3 when a button "b" is operated on the control screen 2a in the state 1, the micro service 200 transmits a message "b" to the micro service 300, and the micro service 300 takes out and executes the message "b". State 6 indicates a state of the display 3 when a button "n" is operated on the control screen 2a in the state 5, the micro service 200 transmits a message "n" to the micro service 300, and the micro service 300 takes out and executes the message "n". State 7 indicates a state of the display 3 when a button "n" is operated on the control screen 2a in the state 6, the micro service 200 transmits a message "n" to the micro service 300, and the micro service 300 takes out and executes the message "n".

When a button "d" is operated on the control screen 2a in the states 2 to 7, the state of the display 3 returns to the state 1. When a button "n" is operated on the control screen 2a in the state 4, the state of the display 3 returns to the state 2. When a button "n" is operated on the control screen 2a in the state 7, the state of the display 3 returns to the state 5.

In this embodiment, in this manner, by issuing an operation instruction of the display 3 to the micro service 200 from the terminal device 2, the micro service 300 transitions the state of the display 3 to a state corresponding to the operation instruction.

Hereinafter, descriptions will be made on the relationship between the message illustrated in FIG. 3 and the transition of the state of the display 3 and the relationship between the message and a deletable message string.

FIGS. 4A to 4C are views for explaining state transition information and a deletable message string. FIG. 4A illustrates an example of state transition information, FIG. 4B illustrates an example of an adjacency matrix, and FIG. 4C illustrates a result of raising the adjacency matrix to a power.

The deletable message string of the present embodiment is identified from state transition information associating a message transmitted from the micro service 200 with the state of the display 3 controlled by the micro service 300. Therefore, the state transition information of the present embodiment is information indicating the state of the service when the micro service 300 receives the message.

In the state transition information 4 illustrated in FIG. 4A, a state Ss before the transition by the message is illustrated in the vertical direction, and a state St after the transition is illustrated in the horizontal direction. An adjacency matrix A illustrated in FIG. 4B represents the state transition information 4 in a matrix form. For example, in the state transition information 4, when the message "a" is transmitted from the micro service 200 to the micro service 300 in the state 1, it is found that the state of the display 3 transitions to the state 2. Further, in the state transition information 4, when the message "d" is transmitted from the micro service 200 to the micro service 300 in the state 4, it is found that the state of the display 3 transitions to the state 1.

In the adjacency matrix A, the transition from the state Ss to the state St with the message a is denoted as an element A(Ss, St)=a. When the element A(Ss, St)=0, it indicates that the state does not transition.

In the present embodiment, a matrix $A^N$ which is a result of raising the adjacency matrix A to the N-th power, which corresponds to the state transition information 4, to the power is obtained. In other words, in the present embodiment, when a message is transmitted N times from the micro service 200 to the micro service 300, that is, when the micro service 300 receives N messages, a correspondence relationship between a state before transition of the display 3 and a state after the transition is obtained.

FIG. 4C illustrates a matrix $A^2$ which is a result of squaring the adjacency matrix A (N=2). An element $A^N$(Ss, St) of the matrix $A^N$ indicates N transitions from the state Ss to the state St, and a value of the element $A^N$(Ss, St) is a message string. A message string is, in other words, a collection of messages. In addition, for N, a relationship of $A^{N-1} \neq A^N = A^{N+1}$ is established.

For example, an element $A^2(1, 1)$ is obtained by the following expression (1).

$$\text{Element } A^2(1,1)=0 0 | ad | 0 d | 0 d | bd | 0 d | 0 d = ad | bd$$

The raising the adjacency matrix A to a power is performed according to the calculation of the usual matrix product. However, in the matrix product of the present embodiment, the multiplication is concatenation of messages, and the addition is the sum of message string sets. For example, the result of the multiplication of a message "a" and a message "d" is a message string "ad". This indicates that the message "d" has been received after the message "a". In addition, in the matrix product of the present embodiment, the result of the addition of a message string "ad" and a message string "bd" is the sum "ad|bd" of the message string sets. This indicates the message string "ad" or the message string "bd".

Here, in the present embodiment, it is considered that when the micro service 300 receives a message string including plural messages, the state of the display 3 may return to the same state as that before the message string is received. When the state of the display 3 returns to the state before the message string is received, the deletion of the message string does not affect the state transition.

Therefore, in the present embodiment, after message string reception, a message string in which the state of a device to be controlled by the micro service returns to the state before message string reception is identified as a deletable message string.

For example, in the matrix $A^2$ of FIG. 4C, it is found that when the message string "ad" or the message string "bd" is received in the state 1, the state returns to the state 1. In addition, in the matrix $A^2$, it is found that when the message string "da" is received in the state 2, the state returns to the state 2.

Therefore, in this case, the message strings "ad", "bd", and "da" are identified as deletable message strings.

In this way, in the present embodiment, a message string that is the value of the diagonal element of the matrix $A^N$ as a result of raising the adjacency matrix A to a power is identified as a deletable message string. In the following description, the matrix $A^N$ obtained as a result of raising the adjacency matrix A to a power will be referred to as a state transition matrix P.

Figure 5A:
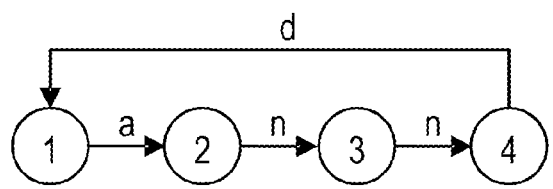
FIGS. 5A and 5B are views for explaining a deletion of a message.
Figure 5B:
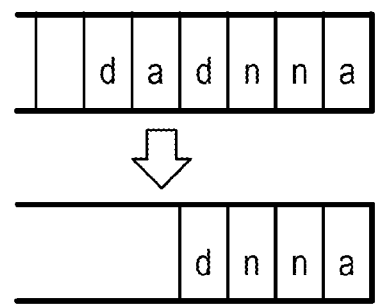

FIGS. 5A and 5B are views for explaining the message deletion. FIG. 5A illustrates a transition of the state of the display 3 when the micro service 300 receives the message strings "a", "n", "n", and "d". FIG. 5B illustrates a message string held in the queue of the micro service 300.

As illustrated in FIG. 5B, when the state of the display 3 is the state 1 and the micro service 300 receives the message strings "a", "n", "n", "d", "a", and "d", the state of the display 3 transitions from state 1 to state 2, from state 2 to state 3, from state 3 to state 4, from state 4 to state 1, from state 1 to state 2, and from state 2 to state 1.

Here, the message string "ad" indicated by the two messages "a" and "d" received from the state 1 is a message string identified as a deletable message string based on the matrix $A^2$.

Therefore, in the present embodiment, the message string "ad" is deleted from the message string "anndad" held in the queue. As a result, the message string held in the queue becomes "annd", the number of messages held in the queue decreases, and the messages are prevented from overflowing and missing from the queue without affecting the state transition. Therefore, according to the present embodiment, the service by the distributed processing system may be appropriately provided.

Figure 6A:
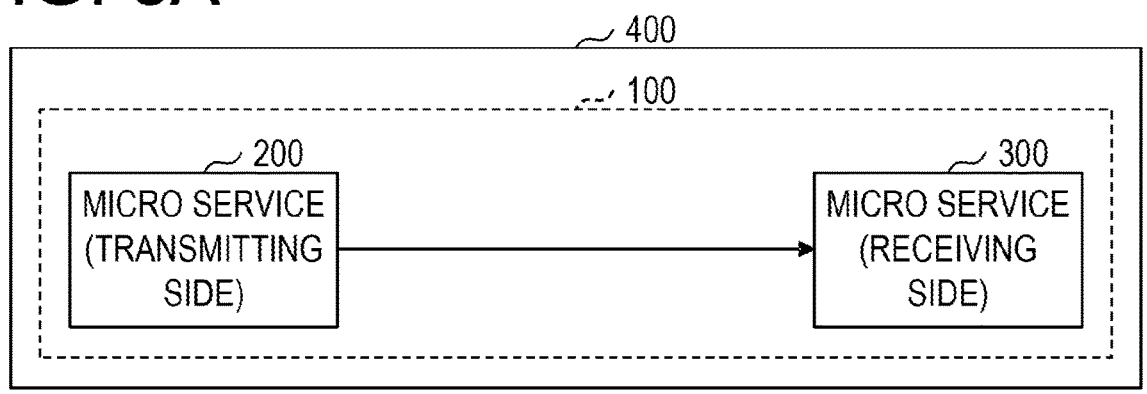
FIGS. 6A and 6B are views illustrating an example of a system configuration of a distributed processing system.
Figure 6B:
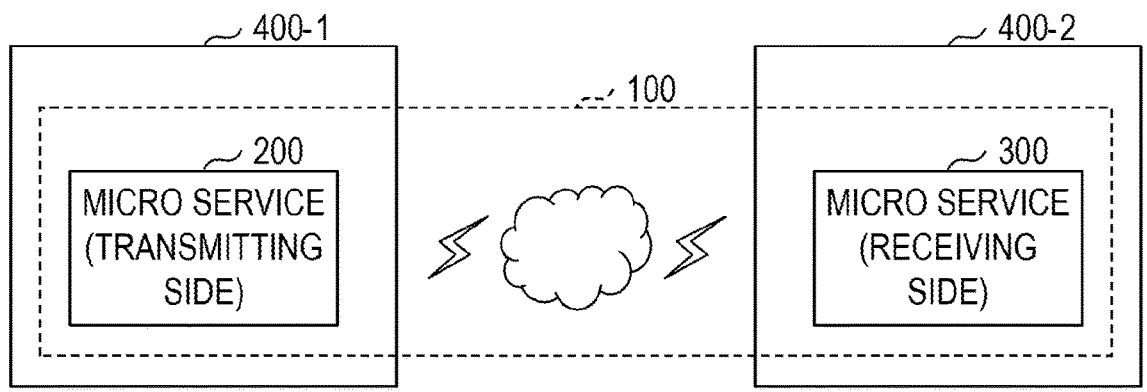

Hereinafter, the distributed processing system of this embodiment will be further described. FIGS. 6A and 6B are views illustrating an example of the system configuration of the distributed processing system.

The distributed processing system 100 according to the present embodiment includes a transmitting side micro service 200 that receives a service request and transmits a message and a receiving side micro service 300 that receives the message and executes a service according to the message.

Each of the micro service 200 and the micro service 300 is an application that implements one function.

Although the distributed processing system 100 of the present embodiment includes the micro service 200 and the micro service 300, the present disclosure is not limited thereto. The distributed processing system 100 may be constructed as a system including micro services other than the micro services 200 and 300.

The distributed processing system 100 of the present embodiment may be built in an information processing apparatus 400, for example, as illustrated in FIG. 6A. In other words, an application that implements each of the micro service 200 and the micro service 300 may be installed in the information processing apparatus 400.

Further, in the distributed processing system 100, for example, as illustrated in FIG. 6B, the micro service 200 and the micro service 300 may be installed in different information processing apparatuses 400-1 and 400-2. In other words, the micro service 200 and the micro service 300 may be installed in separate information processing apparatuses.

Figure 7:
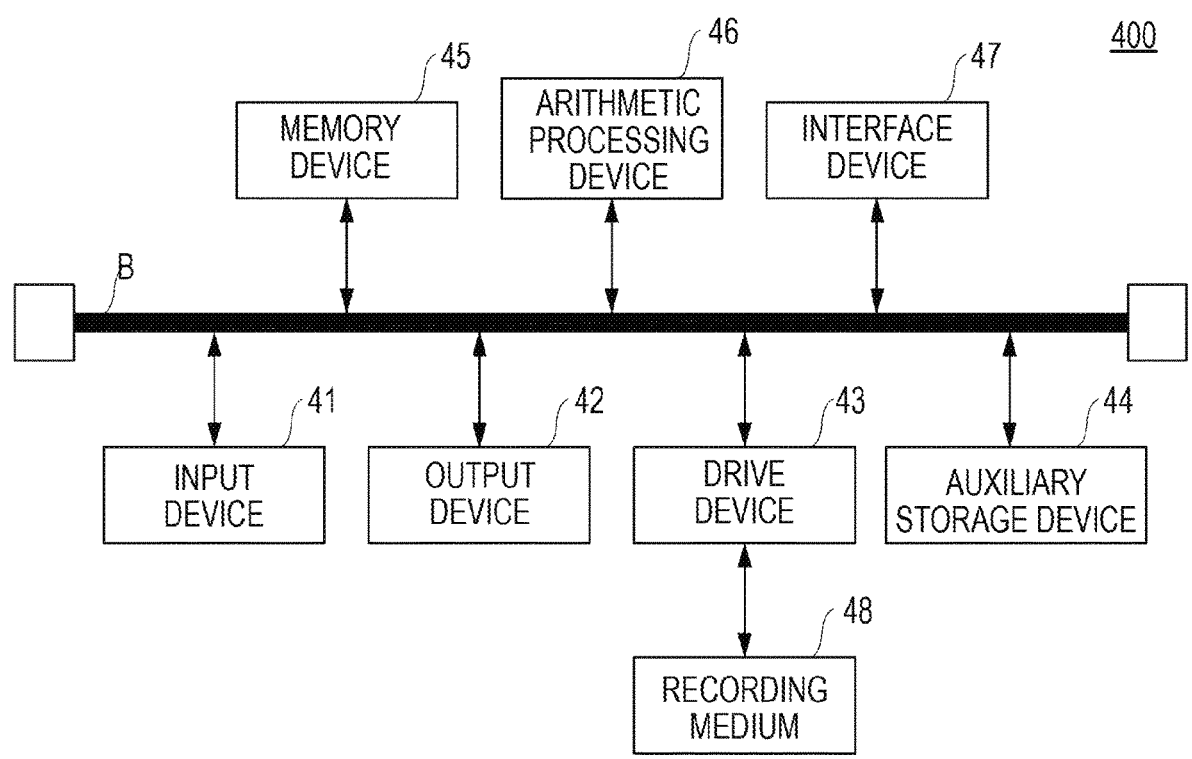
FIG. 7 is a view illustrating an example of a hardware configuration of an information processing apparatus according to a first embodiment.

Hereinafter, the information processing apparatus 400 of the present embodiment will be described. FIG. 7 is a view illustrating an example of the hardware configuration of the information processing apparatus according to the first embodiment.

The information processing apparatus 400 of the present embodiment includes an input device 41, an output device 42, a drive device 43, an auxiliary storage device 44, a memory device 45, an arithmetic processing device 46, and an interface device 47 which are interconnected via a bus B.

The input device 41 is a device for inputting various kinds of information and is implemented by, for example, a keyboard or a pointing device. The output device 42 is for outputting various kinds of information and is implemented by, for example, a display. The interface device 47 includes, for example, a LAN card and is used for a connection to a network.

A program for implementing the micro service according to the present embodiment is at least some of various programs for controlling the information processing apparatus 400. The program is provided, for example, by distributing a storage medium 48 or downloading from the network. The storage medium 48 on which the program is recorded may be one of various types of storage media including a storage medium that optically, electrically or magnetically records information, such as a CD-ROM, a flexible disk, or a magneto-optical disk, and a semiconductor memory that electrically records information, such as a ROM or a flash memory.

Further, when the storage medium 48 storing the program is set in the drive device 43, the program is installed from the storage medium 48 into the auxiliary storage device 44 via the drive device 43. The program downloaded from the network is installed in the auxiliary storage device 44 via the interface device 47.

The auxiliary storage device 44 stores the installed program and also stores, for example, necessary files and data. The memory device 45 reads out and stores the program from the auxiliary storage device 44 when the information processing device 400 is activated. Then, the arithmetic processing device 46 implements various processes to be described later in accordance with the program stored in the memory device 45.

Figure 8:
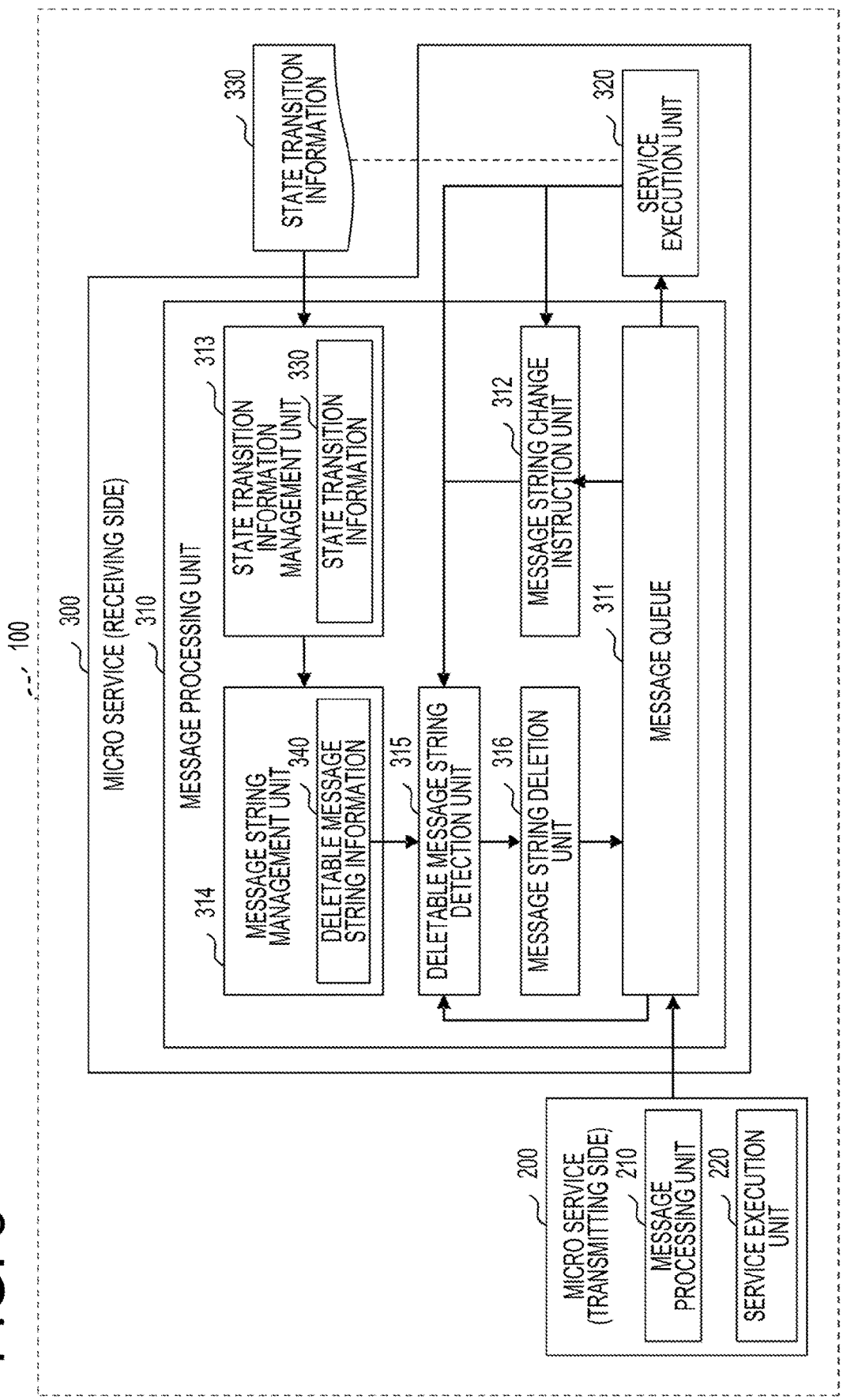
FIG. 8 is a view for explaining functions of the distributed processing system according to the first embodiment.

Next, functions of the distributed processing system 100 of this embodiment will be described with reference to FIG. 8. FIG. 8 is a view for explaining functions of the distributed processing system of the first embodiment.

The distributed processing system 100 of the present embodiment includes a micro service 200 and a micro service 300.

The micro service 200 of the present embodiment includes a message processing unit 210 and a service execution unit 220. The micro service 300 includes a message processing unit 310 and a service execution unit 320.

In each of the micro service 200 and the micro service 300, the message processing unit 210 and the message processing unit 310 detect and delete deletable message strings from message strings held in the queues. Since the message processing unit 210 and the message processing unit 310 have the same functions, the message processing unit 310 will be described later with reference to FIG. 8.

The service execution unit 220 and the service execution unit 320 each execute a service. Specifically, the service execution unit 220 receives a service request and transmits a message corresponding to the service request to the micro service 300. The service execution unit 320 takes out and executes the message held in the queue.

Further, when the service is executed and the state of a device to be controlled (e.g., the display 3) changes, the service executing unit 320 of the present embodiment may notify the current state of the device to the message processing unit 310.

The message processing unit 310 will be described below. The message processing unit 310 includes a message queue 311, a message string change instruction unit 312, a state transition information management unit 313, a message string management unit 314, a deletable message string detection unit 315, and a message string deletion unit 316.

The message queue 311 is a queue in which messages received by the micro service 300 from the micro service 200 are held.

The message string change instruction unit 312 instructs the deletable message string detection unit 315 to execute a process of detecting a deletable message string from the message queue 311. Specifically, when the number of messages held in the message queue 311 becomes larger than a predetermined number, the message string change instruction unit 312 instructs the deletable message string detection unit 315 to execute the process.

The state transition information management unit 313 holds state transition information 330. For example, the state transition information management unit 313 may acquire the state transition information 330 from the configuration information of the micro service 300. The configuration information is, for example, information describing the specification of the micro service 300.

In addition, the state transition information 330 may be generated, for example, by a process of giving various messages to the micro service 300 and associating the messages with a transition of the state of an object to be controlled by the micro service 300.

Further, upon receiving a notification indicating the state of the device after executing the service from the service execution unit 320, the state transition information management unit 313 of the present embodiment may hold the state indicated by this notification as the current state of the device.

The message string management unit 314 identifies a deletable message string from the state transition information 330 and holds deletable message string information 340 indicating the identified deletable message string. Details of the processing by the message string management unit 314 will be described later.

In response to an instruction from the message string change instruction unit 312, the deletable message string detection unit 315 refers to the deletable message string information 340 to detect a deletable message string from the message strings held in the message queue 311.

The message string deletion unit 316 deletes the deletable message string detected by the deletable message string detection unit 315 from the message queue 311.

Next, the state transition information 330 held by the state transition information management unit 313 will be described with reference to FIGS. 9A and 9B.

FIGS. 9A and 9B are views illustrating an example of the state transition information of the first embodiment. FIG. 9A illustrates the data structure of the state transition information, and FIG. 9B illustrates a description describing the state transition information.

In the present embodiment, as illustrated in FIG. 4A, the state transition information 330 may be described as a table.

In the state transition information 330, a pre-transition state, a post-transition state, and a transition message string are associated with each other.

The pre-transition state refers to the state of an object to be controlled before a control corresponding to a message is performed. The post-transition state refers to the state of an object to be controlled after a control corresponding to a message is performed. Here, the object to be controlled is, for example, a device (e.g., the display 3) to be controlled by the service execution unit 320 of the micro service 300. The transition message string refers to a message string received by the micro service 300.

As illustrated in FIG. 9B, in the state transition information 330, for example, when the message "a" is transmitted from the micro service 200 to the micro service 300 in the case of the state 1, it is found that the state of the device to be controlled transitions to the state.

Next, the deletable message string information 340 held by the message string management unit 314 of this embodiment will be described with reference to FIG. 10.

Figure 10:
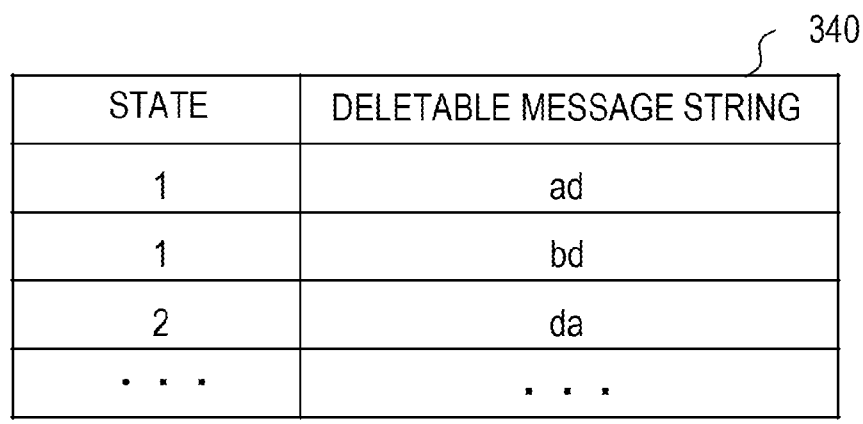
FIG. 10 is a view illustrating an example of deletable message string information according to the first embodiment.

FIG. 10 is a view illustrating an example of the deletable message string information of the first embodiment. The deletable message string information 340 of the present embodiment includes a state and a deletable message string as information items.

A value of the item "state" indicates the state of a device to be controlled by the micro service 300. The value of the item "deletable message string" indicates a deletable message string.

In the deletable message string information 340 of FIG. 10, when the state of the device is "state 1" and a deletable message string "ad" is included in the received message string, the message string "ad" is deleted.

Figure 11:
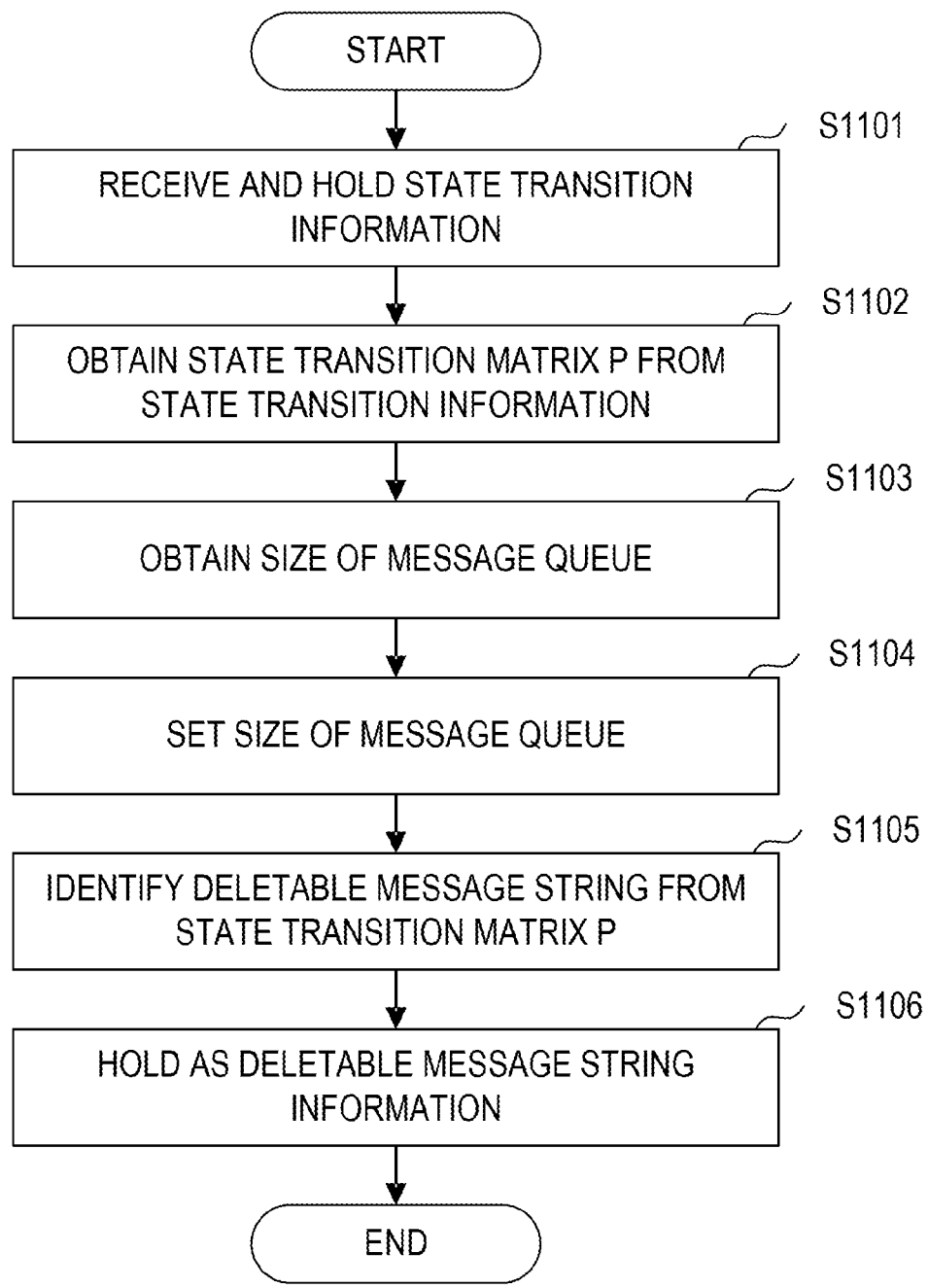
FIG. 11 is a flowchart for explaining a process of generating deletable message string information according to the first embodiment.

Next, a process of identifying a deletable message string by the message string management unit 314 of this embodiment will be described with reference to FIG. 11. FIG. 11 is a flowchart illustrating a process of generating deletable message string information according to the first embodiment.

The process of the message string management unit 314 of this embodiment illustrated in FIG. 11 is executed in advance before the distributed processing system 100 starts to provide a service.

The message string management unit 314 of this embodiment receives and holds the state transition information 330 (step S1101).

Subsequently, the message string management unit 314 obtains a state transition matrix P from the state transition information 330 (step S1102). More specifically, the message string management unit 314 obtains an adjacency matrix from the state transition information 330 and obtains the state transition matrix P by raising the adjacency matrix to the N-th power.

The value of N may be an arbitrary value. For example, the value of N may be a value at which a result obtained when the adjacency matrix is raised to the (N−1)-th power becomes equal to a result obtained when the adjacency matrix is raised to the N-th power.

Subsequently, the message string management unit 314 obtains the size of the message queue 311 from a message string that is an element of the state transition matrix P (step S1103). Specifically, for example, the message string management unit 314 may set the number of messages in a message string including the largest number of messages among message strings which are elements of the state transition matrix P, as the size of the message queue 311.

Subsequently, the message string management unit 314 sets the size obtained in step S1103 in the message queue 311 (step S1104).

Subsequently, the message string management unit 314 identifies a deletable message string from the state transition matrix P (step S1105). Specifically, for example, the message string management unit 314 identifies the value of the diagonal element of the state transition matrix P as a deletable message string.

Subsequently, the message string management unit 314 holds the deletable message string information 340 obtained by associating a specific deletable message string with a state thereof (step S1106).

Figure 12:
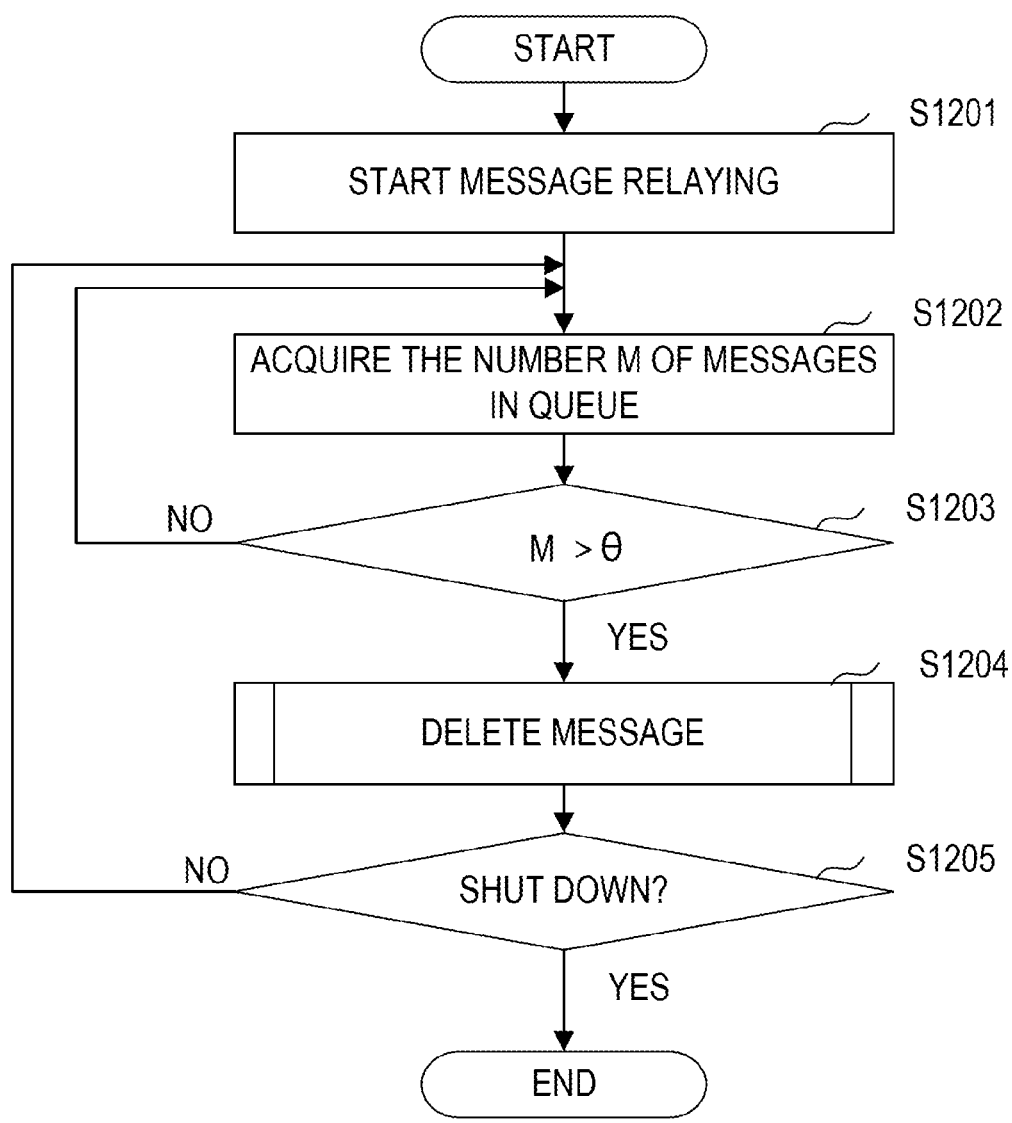
FIG. 12 is a flowchart for explaining a process of a message processing unit according to the first embodiment.

Next, a process of the message processing unit 310 of this embodiment will be described with reference to FIG. 12. FIG. 12 is a flowchart illustrating a process of the message processing unit of the first embodiment.

Upon receiving a message from the micro service 200, the micro service 300 actuates the message processing unit 310 and starts relaying the message (step S1201). Specifically, the message processing unit 310 holds the received message in the message queue 311 so that the service execution unit 320 may extract the message and execute a service.

Subsequently, the message processing unit 310 acquires the number of messages M held in the message queue 311 by the message string change instruction unit 312 (step S1202). Subsequently, the message processing unit 310 determines whether or not the acquired number M is larger than a predetermined value θ by the message string change instruction unit 312 (step S1203). The predetermined value θ may be, for example, a value indicating about 80% of the number of messages set as the size of the message queue 311.

In step S1203, when it is determined that M is not larger than θ, that is, when it is determined that M is equal to or smaller than θ, the message processing unit 310 returns to step S1202.

In step S1203, when it is determined that M is larger than θ, the message string change instruction unit 312 instructs the deletable message string detection unit 315 to detect a deletable message string and instructs the deletable message string detection unit 315 to delete the detected deletable message string (step S1204). Details of step S1204 will be described later.

Subsequently, the message processing unit 310 determines whether or not a device to be controlled (e.g., the display 3) has been shut down (step S1205). When it is determined in step S1205 that the device to be controlled has not been shut down, the message processing unit 310 returns to step S1202.

When it is determined in step S1205 that the device to be controlled has been shut down, the message processing unit 310 ends the process.

In the example of FIG. 12, the message is deleted depending on the number of messages stored in the message queue 311, but the present disclosure is not limited thereto. In the present embodiment, for example, even when the communication between the micro service 300 and the display 3 is disconnected, the message may be deleted.

Figure 13:
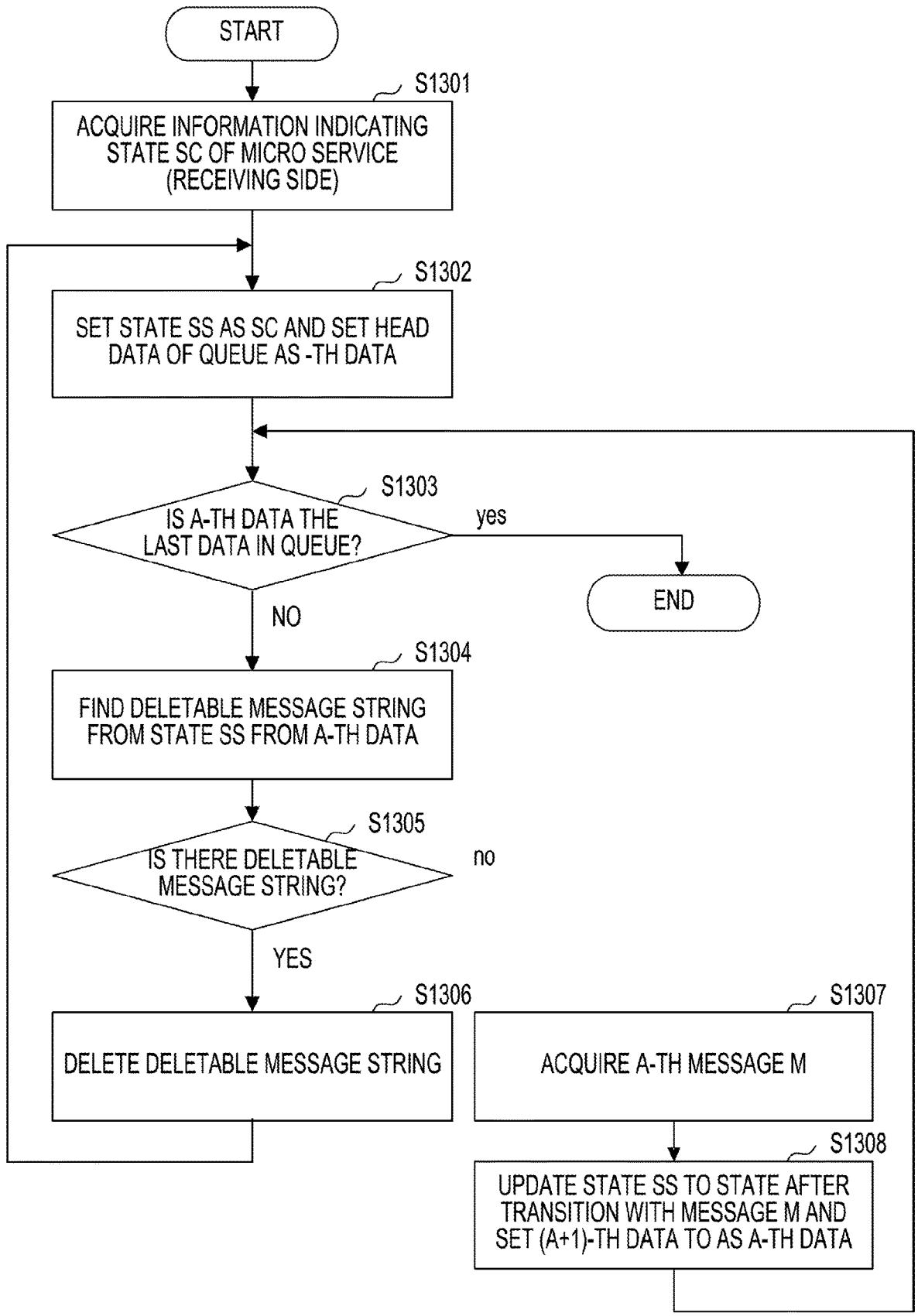
FIG. 13 is a flowchart illustrating a process of deleting a message according to the first embodiment.

Next, the deletion of a message by the message processing unit 310 of the present embodiment will be described with reference to FIG. 13. FIG. 13 is a flowchart illustrating a process of deleting a message according to the first embodiment.

In the message processing unit 310, upon receiving an instruction to detect the deletable message string from the message string change instruction unit 312, the deletable message string detection unit 315 acquires information indicating the current state Sc of a device held by the state transition information management unit 313 (step S1301). Subsequently, the deletable message string detection unit 315 sets the state Ss to the state Sc and sets data stored at the head of the message queue 311 as the α-th data (step S1302).

Subsequently, the deletable message string detection unit 315 determines whether or not the α-th data is the last data (message) stored in the message queue 311 (step S1303). When it is determined in step S1303 that the α-th data is the last stored data, the deletable message string detection unit 315 ends the process.

When it is determined in step S1303 that the α-th data is not the last stored data, the deletable message string detection unit 315 refers to the deletable message string information 340 to find a deletable message string corresponding to the state Ss from the α-th data (step S1304). In other words, the deletable message string detection unit 315 determines whether or not a deletable message string associated with the state Ss and including a message stored at the α-th position in the message queue 311 exists in the deletable message string information 340.

Subsequently, when it is determined that the corresponding deletable message string exists ("Yes" in step S1305), the deletable message string detection unit 315 causes the message queue deletion unit 316 to delete the corresponding deletable message string from the message queue 311 (step S1306) and returns to step S1302.

When it is determined the corresponding deletable message string does not exist ("No" in step S1305), the deletable message string detection unit 315 acquires the α-th message m (step S1307).

Subsequently, the deletable message string detection unit 315 refers to the state transition information 330 to update the state Ss to the state of the device after the transition with the message m. Then, the deletable message string detection unit 315 sets the (α+1)-th data held in the message queue 311 as the α-th data (step S1308) and returns to step S1303.

The message deletion by the message processing unit 310 will be described in detail below with reference to FIGS. 14A to 14C.

FIGS. 14A to 14C are views for specifically explaining the message deletion in the first embodiment. FIG. 14A is a view illustrating a relationship between a message and a transition of the state of a device. FIG. 14B is a view illustrating deletable message string information based on FIG. 14A. FIG. 14C is a view for explaining a message deletion.

Since the relationship between the message and the state transition illustrated in FIG. 14A is the same as the relationship between the message and the display state illustrated in FIG. 3, explanation thereof will be omitted.

In the example of FIGS. 14A to 14C, the deletable message string information illustrated in FIG. 14B is generated by obtaining the state transition matrix P by cubing an adjacency matrix indicating the relationship between the message and the state transition illustrated in FIG. 14A.

In this case, for example, it is assumed that the state of the device held in the state transition information management unit 313 is the state 2. FIG. 14C illustrates a situation where messages are deleted when the state Ss=2.

In step S1 of FIG. 14C, the state Ss is set as the current state 2 of a device, and a message at the head of the message queue 311 is set as the α-th message. Therefore, the α-th message is "n".

At this time, by referring to the deletable message string information of FIG. 14B, the deletable message string detection unit 315 detects a deletable message string "nnn" associated with the state 2 from the message string of the message queue 311, starting from the α-th message "n".

In step S1, the message queue 311 has a message string "nnn" including the α-th message "n". Therefore, the message string deletion unit 316 deletes this message string "nnn" from the message queue 311.

Step S2 of FIG. 14C represents a state in which the message string "nnn" is deleted from the message queue 311. In this case, since the state of the device does not change, the state Ss=2 remains. In addition, when the message at the head of the message queue 311 is the α-th message, the α-th message is "d".

At this time, there is no deletable message string associated with the state 2 and starting with the message "d".

Therefore, the deletable message string detection unit 315 updates the state of the device to a state at the time of receiving the message "d" in the state 2, and sets a message stored second from the head in the message queue 311 as the α-th message.

Step S3 of FIG. 14C represents a state in which the state of the device has been updated from the state 2 to the state 1 and the α-th message is "b".

At this time, there is no deletable message string associated with the state 1 and starting with the message "b".

Therefore, the deletable message string detection unit 315 updates the state of the device to a state at the time of receiving the message "b" in the state 1, and sets a message stored next to the α-th message in the message queue 311 as the α-th message.

In step S4 of FIG. 14C, the state Ss of the device has been updated to the state 5 when the message "b" is received in the state 1, and a message "n" stored third from the head of the message queue 311 is set as the α-th message.

In this case, there exists a deletable message string "nnn" associated with the state 5 and starting with the message "n". Therefore, the message string deletion unit 316 detects and deletes the deletable message string "nnn" from the message string held in the message queue 311 represented in step S4.

In this case, since the state of the device does not change, the state Ss=5. In step S5, a message stored next to the deletable message string "nnn" in the message queue 311 in step S4 becomes the α-th message.

The α-th message "n" in step S5 is the last message in the message string stored in the message queue 311. Therefore, the process of deleting a message ends in the state of step S5 of FIG. 14C.

In this way, in the present embodiment, by deleting messages, the number of messages held in the message queue 311 may be reduced from the number represented in step S1 of FIG. 14C to the number represented in step S5.

In other words, the message string held in the message queue 311 may be shortened. That is, in the present embodiment, a deletable message string detected in the message queue 311 may be said to be a reducible message string to which the message string held in the message queue 311 is reduced. Therefore, the deletable message string detection unit 315 of the present embodiment is a message string detection unit for detecting the reducible message string from the message queue 311 and the message string deletion unit 316 of the present embodiment is a reduction processing unit for reducing a message string held in the message queue 311.

Therefore, according to the present embodiment, it is possible to prevent messages from overflowing from the message queue 311.

In addition, it is assumed that the message process in which the micro service 300 in the message receiving side takes out and executes a message from the message queue 311 is stopped due to any specific cause. In this case, when the micro service 300 restarts the message processing, all the messages accumulated in the message queue 311 are executed during the stop of the micro service 300, which takes time for recovery and uses wasteful resources.

In the present embodiment, the message processing unit 310 reduces the message string held in the message queue 311. Therefore, according to the present embodiment, for example, when the stopped message processing is restarted, it is possible to reduce the time taken to execute the messages held in the message queue 311 while suppressing the use of wasteful resources.

Second Embodiment

Hereinafter, a second embodiment will be described with reference to the drawings. The second embodiment is different from the first embodiment in that in the second embodiment, a replacement of a message is performed in addition to the message deletion. Therefore, in the following description of the second embodiment, the difference from the first embodiment will be described. Further, the same functional configuration as that in the first embodiment will be denoted by the same reference numeral as used in the first embodiment, and explanation thereof will be omitted.

Figure 15:
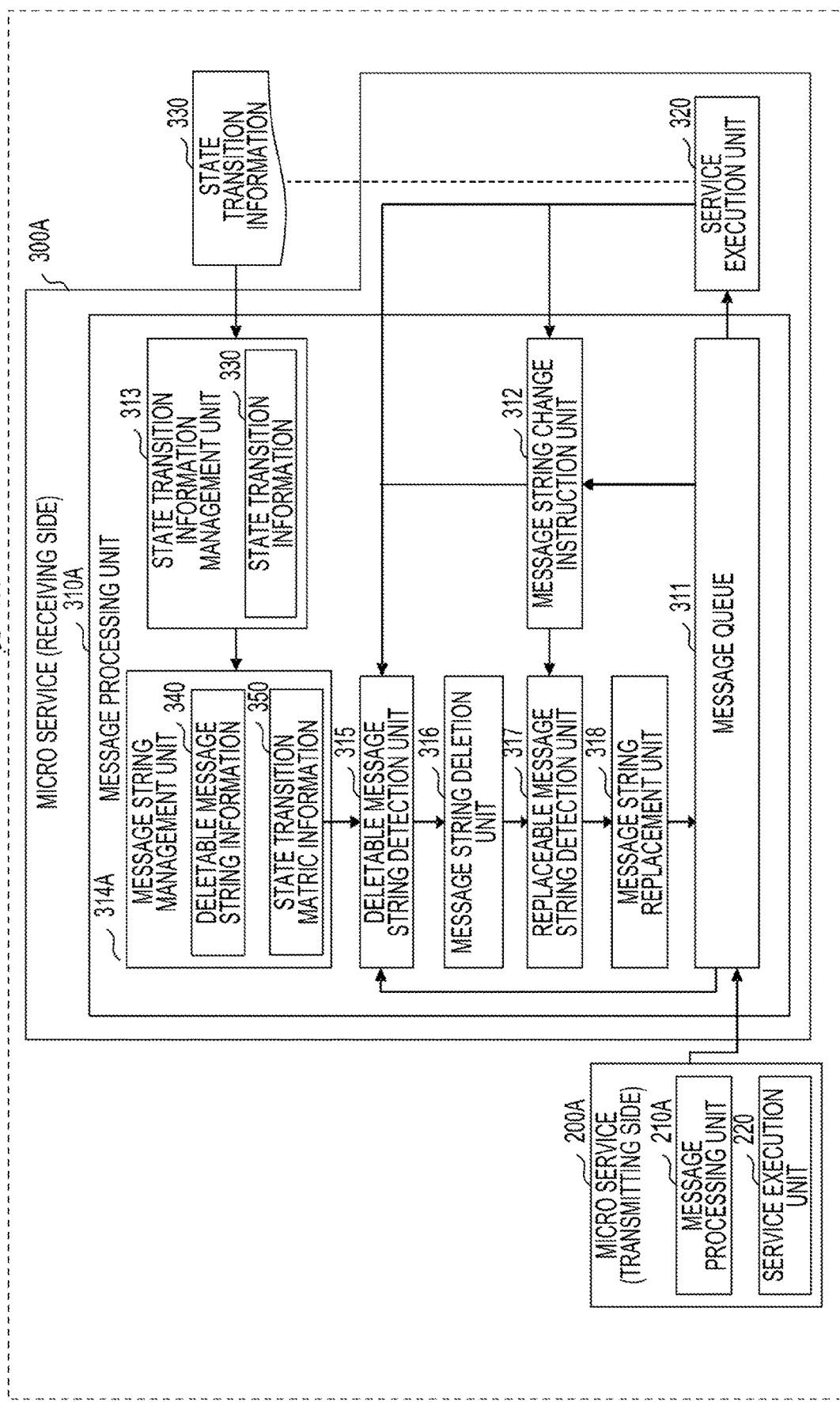
FIG. 15 is a view for explaining functions of a distributed processing system according to a second embodiment.

FIG. 15 is a view for explaining functions of a distributed processing system according to the second embodiment. The distributed processing system 100A of the present embodiment includes a micro service 200A and a micro service 300A.

The micro service 200A includes a message processing unit 210A and a service execution unit 220. Since the message processing unit 210A has the same configuration as that of the message processing unit 310A of the micro service 300A, explanation thereof will be omitted.

The micro service 300A includes a message processing unit 310A and a service execution unit 320.

The message processing unit 310A includes a message queue 311, a message string change instruction unit 312, a state transition information management unit 313, a message string management unit 314A, a deletable message string detection unit 315, a message string deletion unit 316, a replaceable message string detection unit 317, and a message replacement unit 318.

The message string management unit 314A holds deletable message string information 340 and state transition matrix information 350. More specifically, the message string management unit 314A holds a state transition matrix P required to generate the deletable message string information 340, as the state transition matrix information 350. The replaceable message string detection unit 317 detects a message string that may be replaced with a message string with a smaller number of messages from a message string stored in the message queue 311.

When a substitutable message string is detected by the replaceable message string detection unit 317, the message replacement unit 318 replaces the detected message string with a message string having a smaller number of messages.

Figures 16A, 16B:
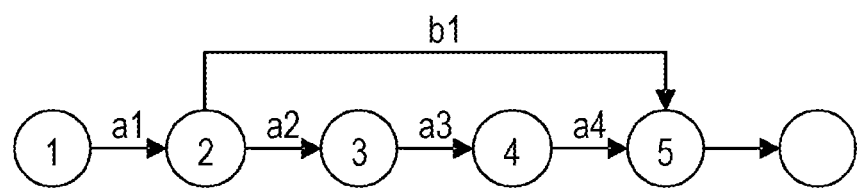
FIGS. 16A and 16B are diagrams for explaining a message replacement according to the second embodiment.

The replacement of a message string in this embodiment will be described below with reference to FIGS. 16A and 16B. FIGS. 16A and 16B are views for explaining the message replacement in the second embodiment. FIG. 16A is a view illustrating a relationship between a message and a transition of the state of a device. FIG. 16B is a view illustrating an example of the state transition matrix information 350.

In the example of FIGS. 16A and 16B, as illustrated in FIG. 16A, when the micro service 300A receives a message a1 and executes a service corresponding to the message a1 in the state 1, the device state transitions to the state 2.

When the micro service 300A receives a message a2 and executes a service in the state 2, the device state transitions to the state 3. When the micro service 300A receives a message a3 and executes a service in the state 3, the device state transitions to the state 4. When the micro service 300A receives a message a4 and executes a service in the state 4, the device state transitions to the state 5.

Further, when the micro service 300A receives a message b1 and executes a service in the state 2, the device state transitions to the state 5.

The state transition matrix information 350 illustrated in FIG. 16B represents a state transition matrix P as a result of quadrupling (N=4) an adjacency matrix indicating the message and the state transition illustrated in FIG. 16A.

In this state transition matrix P, it may be grasped that there are two message strings "b1" and "a2a3a4" to be transitioned from the state 2 to the state 5.

In this way, in the state transition matrix information 350 of the present embodiment, when there are plural message strings to be transitioned from the first state to the second state, the plural message strings are included as elements.

Therefore, in the present embodiment, the replaceable message string detection unit 317 detects plural message strings to be transitioned from the first state to the second state among the message strings stored in the message queue 311. Then, in the present embodiment, the message replacement unit 318 replaces the detected message strings with a message string having the smallest number of messages among the plural message strings.

Figure 17:
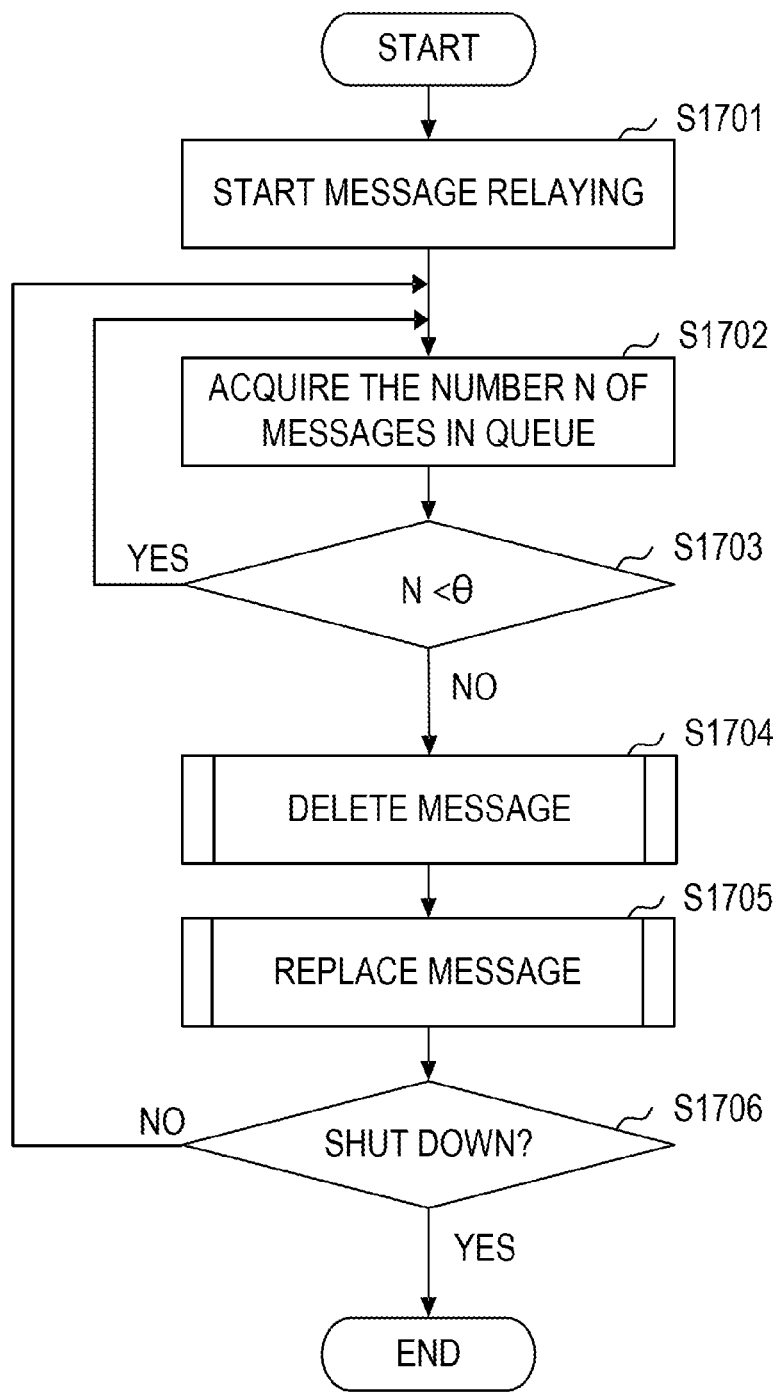
FIG. 17 is a flowchart for explaining a processing of a message processing unit according to the second embodiment.

Next, a process by the message processing unit 310A of this embodiment will be described with reference to FIG. 17. FIG. 17 is a flowchart for explaining a process by the message processing unit of the second embodiment.

Since steps S1701 to S1704 in FIG. 17 are the same as steps S1201 to S1204 in FIG. 12, explanation thereof will be omitted.

Subsequent to step S1704, the replaceable message string detection unit 317 and the message replacement unit 318 replace a message (step S1705), and the process proceeds to step S1706. Details of step S1705 will be described later.

Since step S1706 is the same as step S1205 in FIG. 12, explanation thereof will be omitted.

Figure 18:
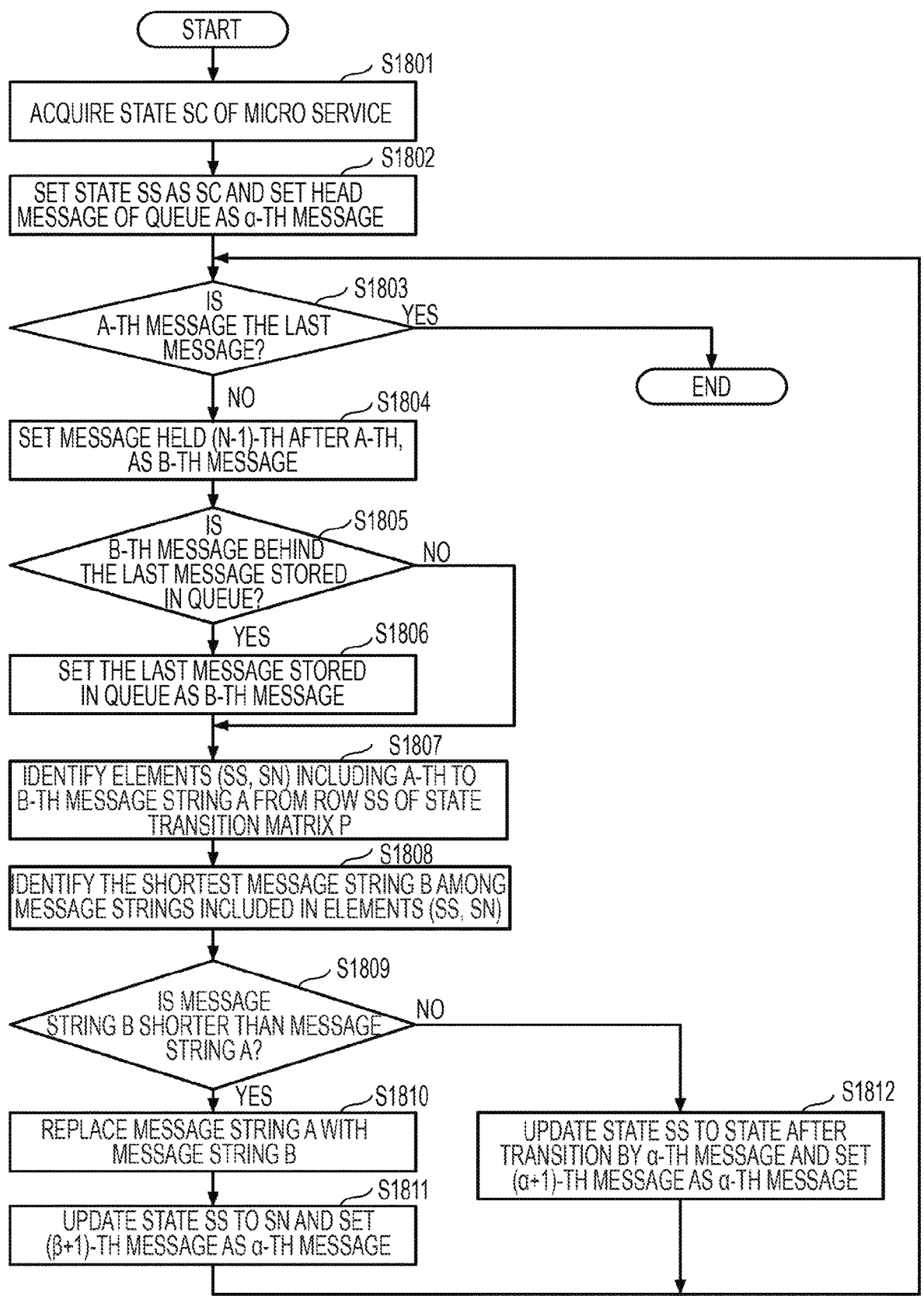
FIG. 18 is a flowchart for explaining a process of replacing a message according to the second embodiment.

Next, the processes performed by the replaceable message string detection unit 317 and the message replacement unit 318 will be described with reference to FIG. 18. FIG. 18 is a flowchart for explaining a process of replacing a message in the second embodiment.

Since steps S1801 to S1803 in FIG. 18 are the same as steps S1301 to S1303 in FIG. 13, explanation thereof will be omitted.

In step S1803, when the α-th message is not the last stored message, the replaceable message string detection unit 317 sets data (message) stored the (N−1)-th after the α-th in the message queue 311, as the β-th data (step S1804).

Subsequently, the replaceable message string detection unit 317 determines whether or not the β-th message is a message behind the last message stored in the message queue 311 (step S1805).

In step S1805, when it is determined that the β-th message is not behind the last message, that is, when N or more messages from the α-th message are stored in the message queue 311, the replaceable message string detection unit 317 proceeds to step S1807 which will be described later.

In step S1805, when it is determined that the β-th message is behind the last message, the last message stored in the message queue 311 is set as the β-th message (step S1806).

Subsequently, the replaceable message string detection unit 317 identifies elements (Ss, SN) including a message string A of the α-th to β-th messages stored in the message queue 311 from the state transition matrix P indicated by the state transition matrix information 350 (step S1807).

Subsequently, the replaceable message string detection unit 317 identifies the shortest message string B among the message strings included in the elements (Ss, SN) (step S1808). The shortest message string refers to a message string having the smallest number of messages.

Subsequently, the replaceable message string detection unit 317 determines whether or not the message string B is shorter than the message string A (step S1809).

In step S1809, when it is determined that the message string A is longer than the message string B, that is, when the number of messages included in the message string A is larger than the number of messages included in the message string B, the replaceable message string detection unit 317 proceeds to step S1810.

The message processing unit 310A replaces the message string A held in the message queue 311 with the message string B by the message replacement unit 318 (step S1810). Subsequently, the message replacement unit 318 updates the state Ss to the state SN, sets a message stored next to the β-th message as the α-th message (step S1811), and returns to step S1803. In addition, the state SN refers to a device state after performing a service corresponding to the message string A on a device of the state Ss.

In step S1809, when it is determined that the message string A is equal to or shorter than the message string B, that is, when the number of messages included in the message string A is equal to or smaller than the number of messages included in the message string B, the replaceable message string detection unit 317 proceeds to step S1812. The replaceable message string detection unit 317 refers to the state transition information 330 to update the state Ss to a device state after transition by the α-th message m, sets the (α+1)-th data held in the message queue 311 as the α-th data (step S1812), and returns to step S1803.

Figure 19:
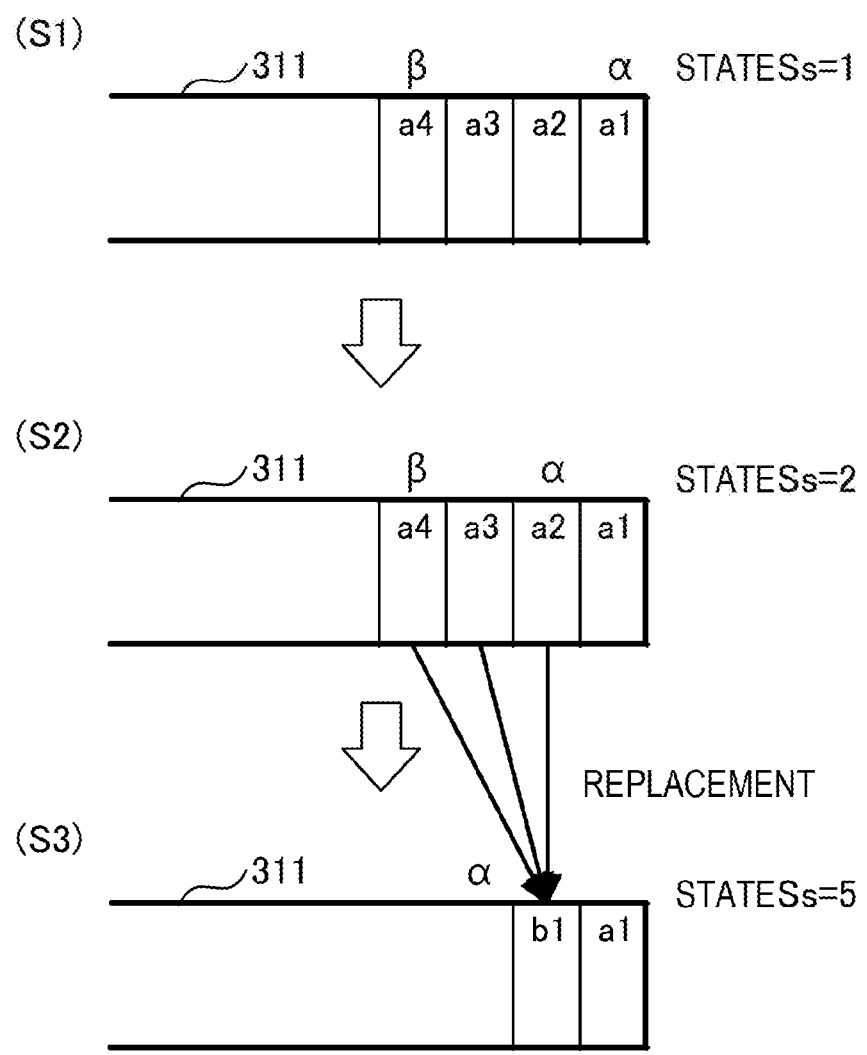
FIG. 19 is a view for specifically explaining the message replacement according to the second embodiment.

The message replacement in this embodiment will be described in detail below with reference to FIG. 19. FIG. 19 is a view for specifically explaining the message replacement in the second embodiment.

Step S1 in FIG. 19 illustrates a case where the device state Ss=1, four messages are stored in the message queue 311, and the head message is a message "a1".

Here, it is assumed that the head message is the α-th message and a message stored the (N−1)-th after the α-th is the β-th message. In the example of FIG. 19, the state transition matrix P indicated by the state transition matrix information 350 is a matrix obtained by quadrupling (N=4) an adjacency matrix indicating the state transition information.

Therefore, here, the first message is the α-th message and a message "a4" stored third after the α-th is the β-th message (see FIGS. 16A and 16B). Therefore, in this case, the message string A=a1a2a3a4.

Therefore, the replaceable message string detection unit 317 identifies elements (Ss, SN) having the state Ss=1 and including the message string A from the state transition matrix P indicated by the state transition matrix information 350.

Here, the value of the corresponding elements (Ss, SN) is only the message string A and does not include plural message strings.

Therefore, as illustrated in step S2 of FIG. 19, the replaceable message string detection unit 317 obtains the β-th message with the (α+1)-th message "a2" as the α-th message. In this case, only four messages are held in the message queue 311 and there is no third message after the message "a2". Therefore, the replaceable message string detection unit 317 sets the last message "a4" stored in the message queue 311, as the β-th message. Therefore, in this case, the message string A=a2a3a4.

In addition, the replaceable message string detection unit 317 updates the device state Ss=1 to the state Ss=2 after the service corresponding to the message a1 is executed for the device (see FIGS. 16A and 16B).

Next, the replaceable message string detection unit 317 identifies elements (Ss, SN) including the message string A and having the state Ss=2 from the state transition matrix P indicated by the state transition matrix information 350.

Here, the value of the corresponding elements (Ss, SN) is a message string "b1|a2a3a4" and includes another message string of the message string A. That is, the value of the elements (Ss, SN) includes plural message strings. Therefore, the replaceable message string detection unit 317 identifies the shortest message string B among the plural message strings. Here, the message string B=b1.

The message string B is shorter than the message string A. Therefore, the message replacement unit 318 replaces the message string A with the message string B.

In step S3, "a2a3a4" which is the message string A is replaced with "b1" which is the message string B.

Further, the value of the device state Ss is updated to the state Ss=5 after the service corresponding to the message b1 is executed for the device in the state Ss=2 (see FIGS. 16A and 16B).

In this way, in the present embodiment, when there are plural message strings to be transitioned from the first state to the second state, a message string having the smallest length becomes a message string to be held in the message queue 311.

Therefore, in the present embodiment, it is possible to reduce the number of messages held in the message queue 311 and shorten the length of the message strings held in the message queue 311. That is, the message string A of the present embodiment may be said to be a reducible message string to which the message string held in the message queue 311 is reduced. Further, the message string A may be said to be a replaceable message string to be replaced with the message string B.

Therefore, the replaceable message string detection unit 317 of the present embodiment is a message string detection unit that detects the reducible message string, and the message replacement unit 318 of the present embodiment is a reduction processing unit that reduces the message string held in the message queue 311 by using the reducible message string. Therefore, according to the present embodiment, it is possible to prevent messages from overflowing and missing from the message queue 311.

In the present embodiment, a message string is further shortened by deleting and replacing a message string, rather than only deleting the message string. However, the present disclosure is not limited thereto. For example, the message processing unit 310A may perform only the replacement of a message string.

Further, in the present embodiment, when a deletable message string is identified in a diagonal element of the state transition matrix P, the longest one of the message strings included in the diagonal element may be used as a deletable message string. When the deletable message string is identified in this manner, a relatively long message string may be deleted from the message queue 311 so that the message string held in the message queue 311 may be shortened. Therefore, it is possible to preventing messages from overflowing from the message queue 311.

Third Embodiment

Hereinafter, a third embodiment will be described with reference to the drawings. The third embodiment is different from the second embodiment in that in the third embodiment, the state transition information includes a message which is prohibited from being deleted or replaced. Therefore, in the following description of the third embodiment, only the difference from the second embodiment will be described. Further, the same functional configuration as that in the second embodiment will be denoted by the same reference numeral as used in the second embodiment, and explanation thereof will be omitted.

Figure 20:
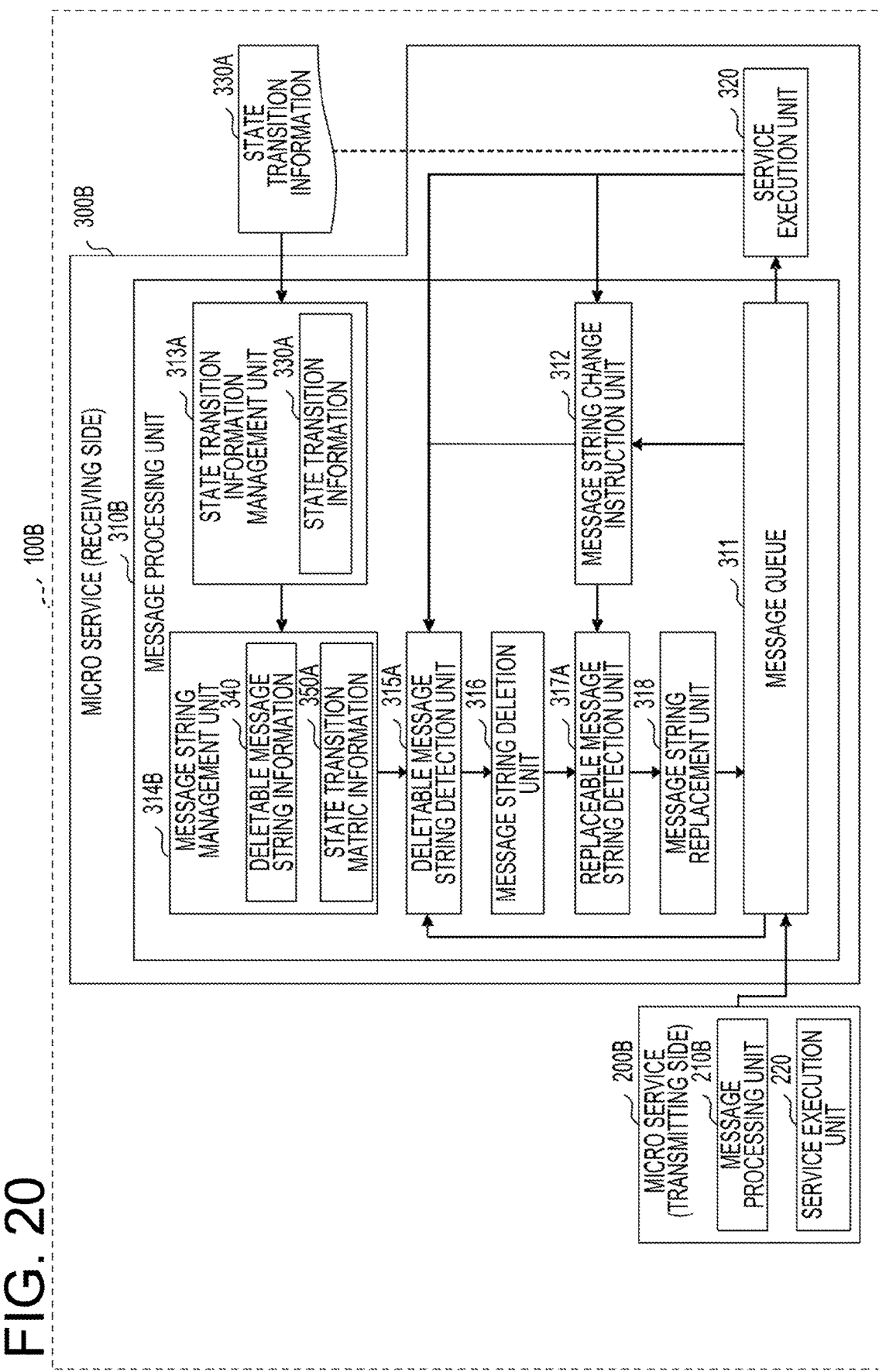
FIG. 20 is a view for explaining functions of a distributed processing system according to a third embodiment.

FIG. 20 is a view for explaining functions of a distributed processing system according to the third embodiment. The distributed processing system 100B of the present embodiment includes a micro service 200B and a micro service 300B.

The micro service 200B includes a message processing unit 210B and a service execution unit 220. Since the message processing unit 210B has the same configuration as that of the message processing unit 310B of the micro service 300B, explanation thereof will be omitted.

The micro service 300B includes a message processing unit 310B and a service execution unit 320.

The message processing unit 310A includes a message queue 311, a message string change instruction unit 312, a state transition information management unit 313A, a message string management unit 314B, a deletable message string detection unit 315A, a message string deletion unit 316, a replaceable message string detection unit 317A, and a message replacement unit 318.

The state transition information management unit 313A holds state transition information 330A. Details of the state transition information 330A will be described later.

The message string management unit 314B holds deletable message string information 340 and state transition matrix information 350A.

The deletable message string detection unit 315A detects a deletable message string which does not include a message prohibited from being deleted, among the message strings held in the message queue 311. The replaceable message string detection unit 317A detects a message string which does not include a message prohibited from being replaced and is replaceable with a shorter message string, among the message strings held in the message queue 311.

The state transition information 330A and the state transition matrix information 350A of this embodiment will be described below with reference to FIGS. 21A and 21B. FIGS. 21A and 21B are views illustrating an example of the state transition information and the state transition matrix of the third embodiment. FIG. 21A is a view illustrating an example of the state transition information 330A, and FIG. 21B is a view illustrating an example of the state transition matrix information 350A.

In the state transition information 330A of the present embodiment, specific identification information is given to a message that is prohibited from being deleted or replaced during a state transition. That is, the specific identification information given to the message is information indicating that a reduction of the corresponding message is prohibited and that the corresponding message is not included in a reducible message string.

In the example of FIG. 21A, an exclamation mark is given as the specific identification information. However, a mark to be given is not limited thereto but any mark may be used.

In the state transition information 330A, for example, it may be grasped that a message "a" to transition the state 1 to the state 2 is prohibited from being deleted or replaced when the message is received in the state 1. Further, in the state transition information 330A, for example, it may grasped that a message "b" to transition the state 1 to the state 5 is prohibited from being deleted or replaced when the message is received in the state 1.

In the state transition matrix information 350A of the present embodiment, the identification information (mark) given to the state transition information 330A remains.

Therefore, for example, when the message to which the specific identification information is given is included in a message string which is held in a diagonal element of the state transition matrix information 350, this message string does not become a deletable message string.

Figure 22:
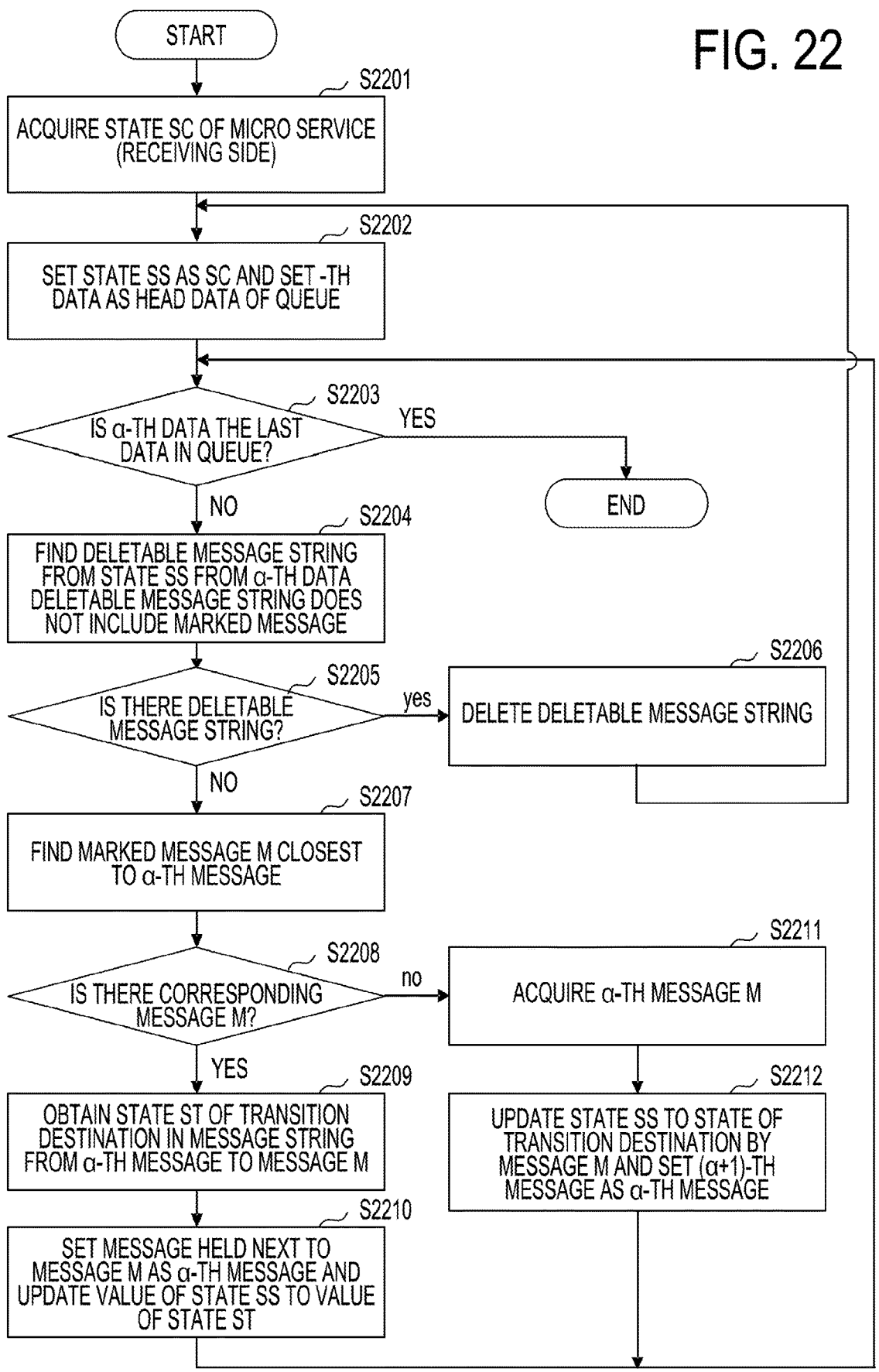
FIG. 22 is a flowchart for explaining a process of deleting a message according to the third embodiment.

Next, a process of deleting a message by the deletable message string detection unit 315A and the message string deletion unit 316 of the present embodiment will be described with reference to FIG. 22. FIG. 22 is a flowchart illustrating a process of deleting a message according to the third embodiment.

Since steps S2201 to S2203 in FIG. 22 are the same as steps S1301 to S1303 in FIG. 13, explanation thereof will be omitted.

In step S2203, when the α-th message is not the last message stored in the message queue 311, the deletable message string detection unit 315A finds a deletable message string corresponding to the state Ss from the α-th data (step S2204) and proceeds to step S2205.

In other words, the deletable message string detection unit 315A determines whether or not a deletable message string associated with the state Ss and including a message stored the α-th in the message queue 311 exists in the deletable message string information 340. In the present embodiment, the deletable message string does not include a message to which the specific identification information is given.

Since steps S2205 and S2206 are the same as steps S1305 and S1306 in FIG. 13, explanation thereof will be omitted.

When it is determined in step S2205 that there is no deletable message string, the deletable message string detection unit 315A finds a message "m" which is given the identification information and is closest to the α-th message (step S2207).

Subsequently, the deletable message string detection unit 315A determines whether or not the corresponding message "m" exists in the message queue 311 (step S2208). When it is determined in step S2208 that the corresponding message "m" exists in the message queue 311, the deletable message string detection unit 315A refers to the state transition information 330A to obtain a value of the state St after the transition of the state Ss by a message string of the α-th message to the message "m" (step S2209).

Subsequently, the deletable message string detection unit 315A sets a message held next to the message "m" in the message queue 311, as the α-th message, updates the value of the state Ss to the value of the state St (step S2210), and returns to step S2203.

When it is determined in step S2208 that the corresponding message "m" exists in the message queue 311, the deletable message string detection unit 315A acquires the α-th message "m" (step S2211). Subsequently, the deletable message string detection unit 315A updates the value of the state Ss to a state after the transition by the message "m", sets the (α+1)-th message as the α-th message (step S2212), and returns to step S2203.

Next, a process of replacing a message by the replaceable message string detection unit 317A and the message replacement unit 318 of the present embodiment will be described with reference to FIG. 23.

Figure 23:
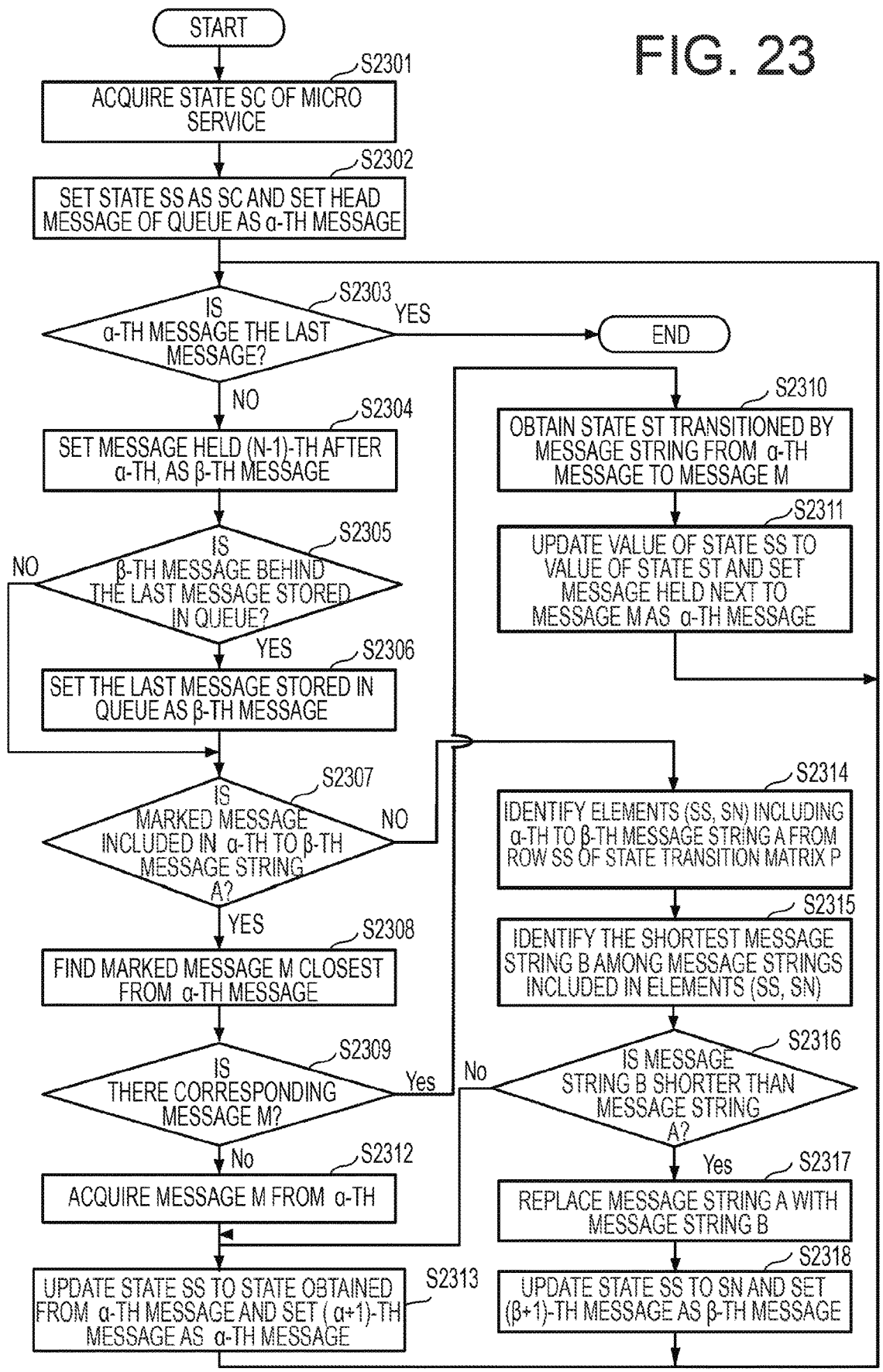
FIG. 23 is a flowchart for explaining a process of replacing a message according to the third embodiment.

FIG. 23 is a flowchart illustrating a process of replacing a message in the third embodiment.

Since steps S2301 to S2306 in FIG. 23 are the same as steps S1801 to S1806 in FIG. 18, explanation thereof will be omitted.

Subsequent to step S2306, the replaceable message string detection unit 317A determines whether or not a message with a mark is included in a message string A of the α-th to β-th messages (step S2307).

When it is determined in step S2307 that a message with a mark is not included in the α-th to β-th message string A, the process proceeds to step S2314 to be described later.

When it is determined in step S2307 that a message with a mark is included in the α-th to β-th message string A, the replaceable message string detection unit 317A finds a message "m" which has a mark and is closest from the α-th message in the message queue 311 (step S2308).

Since steps S2308 to S2313 are the same as steps S2207 to S2212 in FIG. 22, explanation thereof will be omitted.

In a case where a message with a mark is not included in the α-th to β-th message string A in step S2307, steps S2314 to S2318 are the same as steps S1807 to S1811 in FIG. 18, and thus, explanation thereof will be omitted. In addition, when it is determined in step S2316 that the message string A is equal to or shorter than the message string B, the replaceable message string detection unit 317A proceeds to step S2313.

Figure 24A:
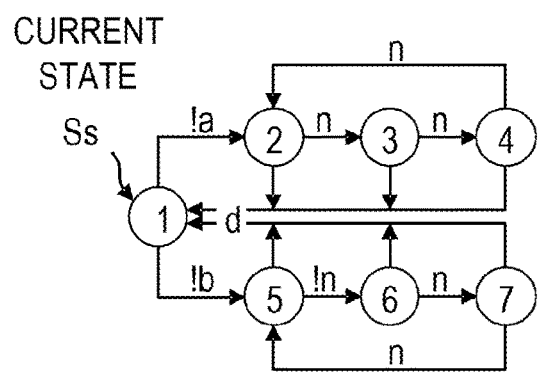
FIGS. 24A and 24B are views for explaining message deletion and replacement according to the third embodiment.
Figure 24B:
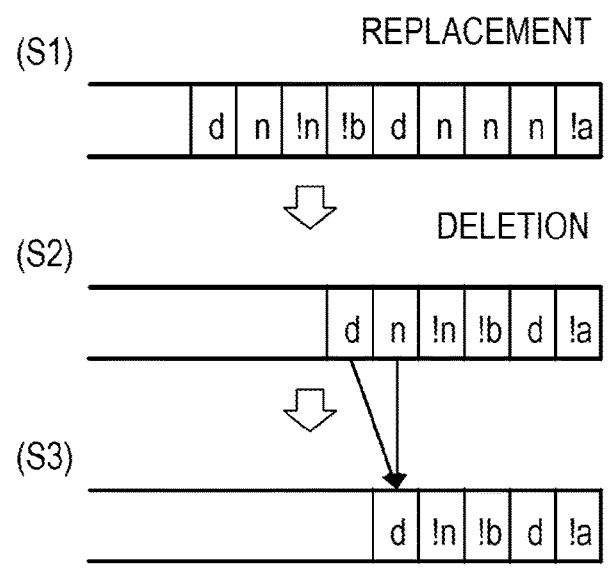

Next, the process of the message processing unit 310B of the present embodiment will be described in detail with reference to FIGS. 24A and 24B. FIGS. 24A and 24B are views for explaining message deletion and replacement in the third embodiment. FIG. 24A is a view illustrating a relationship between a message and a transition of the device state. FIG. 24B is a view for explaining a message replacement.

In the example of FIGS. 24A and 24B, as illustrated in FIG. 24A, an exclamation mark is given to each of a message "a" to transition the device from the state 1 to the state 2, a message "b" to transition the device from the state 1 to the state 5, and a message "n" to transition the device from the state 5 to the state 6. Thus, in the example of FIGS. 24A and 24B, the messages "a" and "b" in the state 1 and the message "n" in the state 5 correspond to marked messages.

Step S1 of FIG. 24B represents a message string held in the message queue 311 when the device state is the state 1.

Here, the head message "a" is a marked message. The deletable message string information 340 does not include a marked message. Therefore, the deletable message string detection unit 315A updates the device state to the state 2 after transitioning with the message "a", and sets a message "n" held next to the message "a", as the α-th message.

A deletable message string "nnn" associated with the state 2 and including the message "n" exists in the deletable message string information 340 (see FIG. 14B). Therefore, in step S2 of FIG. 24B, the message string "nnn" is deleted from the message queue 311.

Further, in step S2, a message "n" held third after the marked message "a" is set as the β-th message. In this case, a marked message is included in the message string of the α-th message "a" to the β-th message "n".

Therefore, the replaceable message string detection unit 317A updates the state 2 to the state 6 after the transition by the message string of the α-th to β-th messages. Then, a message "n" held next to the β-th message is set as the α-th message. At this time, since the last message "d" stored in the message queue 311 is the β-th message, a message string A of the α-th to β-th messages is "nd".

In this case, it is assumed that the value of elements (Ss, SN) including the message string A in the row of the state 6 of the state transition matrix P is "d|nd". In this case, the shortest message string B included in the elements (Ss, SN) is "d" and has a smaller number of messages than the message string A.

Therefore, in step S3 of FIG. 24B, "nd" which is the message string A is replaced with "d" which is the message string B.

In this way, according to the present embodiment, it is possible to shorten the message string held in the message queue 311 while leaving a message that is prohibited from being deleted or replaced, thereby preventing messages from overflowing and missing from the message queue.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and the processor configured to:
   identify a reducible message string by using state transition information, the reducible message string being used to reduce a message string held in a message queue, the state transition information indicating a relationship between a message for executing a service and transition of a state of the service;
   detect the reducible message string included in the message string; and
   reduce the message string held in the message queue by using the reducible message string.

2. The information processing apparatus according to claim 1, wherein
   the reducible message string is a deletable message string such that a state before executing a service corresponding to the reducible message string is same as a state after executing the service corresponding to the reducible message string, and
   the processor is further configured to delete the deletable message string from the message string held in the message queue.

3. The information processing apparatus according to claim 2, wherein
   the deletable message string is a message string included in a diagonal element of a state transition matrix obtained by raising a matrix indicating the state transition information to a power.

4. The information processing apparatus according to claim 3, wherein
   the deletable message string is a longest message string among one or more message strings included in the diagonal element.

5. The information processing apparatus according to claim 1, wherein
   the reducible message string is a replaceable message string which may be replaced with a first message string shorter than the replaceable message string in the message string held in the message queue, and
   the processor is further configured to replace the replaceable message string with the first message string.

6. The information processing apparatus according to claim 5, wherein
the first message string is a shortest message string among message strings included in a first element of a state transition matrix obtained by raising a matrix indicating the state transition information to a power, the first element including the replaceable message string.

7. The information processing apparatus according to claim 1, wherein
the processor is further configured to exclude, when a first message is included in a first message string held in the message queue, the first message string from the reducible message string, the first message being given with identification information indicating prohibition of reduction.

8. A distributed processing method, comprising:
identifying, by a computer, a reducible message string by using state transition information, the reducible message string being used to reduce a message string held in a message queue, the state transition information indicating a relationship between a message for executing a service and transition of a state of the service;
detecting the reducible message string included in the message string; and
reducing the message string held in the message queue by using the reducible message string.

9. A non-transitory computer-readable recording medium having stored therein a program that causes a computer to execute a process, the process comprising:
identifying a reducible message string by using state transition information, the reducible message string being used to reduce a message string held in a message queue, the state transition information indicating a relationship between a message for executing a service and transition of a state of the service;
detecting the reducible message string included in the message string; and
reducing the message string held in the message queue by using the reducible message string.

* * * * *